US009398349B2

(12) United States Patent
Maruyama et al.

(10) Patent No.: US 9,398,349 B2
(45) Date of Patent: Jul. 19, 2016

(54) COMMENT INFORMATION GENERATION DEVICE, AND COMMENT DISPLAY DEVICE

(71) Applicant: PANASONIC CORPORATION, Kadoma-shi, Osaka (JP)

(72) Inventors: Ayako Maruyama, Osaka (JP); Kunio Nobori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 105 days.

(21) Appl. No.: 14/279,303

(22) Filed: May 15, 2014

(65) Prior Publication Data

US 2014/0344853 A1    Nov. 20, 2014

(30) Foreign Application Priority Data

May 16, 2013 (JP) ................................. 2013-104547

(51) Int. Cl.
*H04N 5/445* (2011.01)
*H04N 21/81* (2011.01)
(Continued)

(52) U.S. Cl.
CPC ..... *H04N 21/8133* (2013.01); *H04N 21/23418* (2013.01); *H04N 21/4788* (2013.01); *H04N 21/8583* (2013.01)

(58) Field of Classification Search
CPC .................... H04N 21/44008; H04N 21/4725; H04N 21/47205; H04N 21/4788
See application file for complete search history.

(56) References Cited

U.S. PATENT DOCUMENTS

| 5,523,791 A * | 6/1996 | Berman ................. A63F 13/06 348/580 |
| 2001/0023436 A1* | 9/2001 | Srinivasan ............ G06T 7/2033 709/219 |

(Continued)

FOREIGN PATENT DOCUMENTS

| JP | 2004-128614 A | 4/2004 |
| JP | 2008-148071 A | 6/2008 |

(Continued)

OTHER PUBLICATIONS

Anandan, P. et al., "A Computational Framework and an Algorithm for the Measurement of Visual Motion," International Journal of Computer Vision; vol. 2; pp. 283-310, 1989.

(Continued)

*Primary Examiner* — Pankaj Kumar
*Assistant Examiner* — Timothy Newlin
(74) *Attorney, Agent, or Firm* — McDermott Will & Emery LLP

(57) ABSTRACT

A comment information generation device includes: a video input section, to which a video is input; an information input section, to which positional information is input to display a comment to track an object in the video; an initial trajectory acquisition section that acquires an initial trajectory that is a trajectory of the object corresponding to the positional information; a trajectory extending section that acquires an extended trajectory by acquiring a following trajectory that is a trajectory having a starting point after an ending point of the initial trajectory, collecting a first comment assigned in a vicinity of the initial trajectory and a second comment assigned in a vicinity of the following trajectory, and connecting the following trajectory to the initial trajectory on a basis of the first comment and the second comment; and an output section that outputs the extended trajectory as comment information.

21 Claims, 22 Drawing Sheets

(51) Int. Cl.
*H04N 21/234* (2011.01)
*H04N 21/4788* (2011.01)
*H04N 21/858* (2011.01)

(56) References Cited

U.S. PATENT DOCUMENTS

| | | | | |
|---|---|---|---|---|
| 2003/0182663 | A1* | 9/2003 | Gudorf | H04N 7/173 725/110 |
| 2004/0059783 | A1* | 3/2004 | Kazui | G06F 17/30817 709/205 |
| 2004/0068758 | A1* | 4/2004 | Daily | H04N 7/17318 725/136 |
| 2005/0078221 | A1* | 4/2005 | Kobayashi | H04N 5/278 348/600 |
| 2005/0223034 | A1* | 10/2005 | Kaneko | G06F 21/10 |
| 2005/0244148 | A1* | 11/2005 | Tsumagari | G11B 27/005 386/241 |
| 2008/0212938 | A1* | 9/2008 | Sato | A63F 13/02 386/239 |
| 2008/0235587 | A1* | 9/2008 | Heie | H04N 7/142 715/719 |
| 2008/0285940 | A1* | 11/2008 | Kulas | G11B 27/3027 386/248 |
| 2009/0150947 | A1* | 6/2009 | Soderstrom | G06F 17/30817 725/93 |
| 2009/0180023 | A1* | 7/2009 | Kim | H04N 7/24 348/468 |
| 2009/0297118 | A1* | 12/2009 | Fink | G06F 17/3082 386/278 |
| 2010/0080536 | A1* | 4/2010 | Marumori | G06F 17/30017 386/338 |
| 2010/0188936 | A1* | 7/2010 | Beppu | A63F 13/12 368/10 |
| 2010/0238323 | A1* | 9/2010 | Englund | G11B 27/034 348/239 |
| 2011/0273474 | A1* | 11/2011 | Iwayama | H04N 5/23219 345/636 |
| 2012/0038626 | A1* | 2/2012 | Kim | H04N 13/007 345/419 |
| 2012/0079535 | A1* | 3/2012 | Kivirauma | H04W 4/021 725/37 |

FOREIGN PATENT DOCUMENTS

| | | |
|---|---|---|
| JP | 2009-053743 A | 3/2009 |
| JP | 2009-081592 A | 4/2009 |
| JP | 2010-244437 A | 10/2010 |
| JP | 2011-159098 A | 8/2011 |
| JP | 4994525 B | 8/2012 |
| WO | 2010/116820 A1 | 10/2010 |

OTHER PUBLICATIONS

Felzenszwal, P. F. et al., "Efficient Graph-Based Image Segmentation," vol. 59, Issue 2, pp. 167-181(26 pages), 2004.

Kolmogorov, V. et al., "Computing Visual Correspondence with Occlusions via Graph Cuts," ICCV. Proceedings. Eighth IEEE International Conference on Computer Vision, Vancouver, BC. vol. 2; pp. 508-515, 2001.

Shi, J. et al., "Good Features to Track," IEEE Conference on Computer Vision and Pattern Recognition. Seattle, WA. 8 pages, 1994.

* cited by examiner (a)

(b)

(a)

(b)

(a)

(b)

(a)

(b)

(a)

COMMENT TARGET PERSON 1401
COMMENT TARGET PERSON 1401

(b)

COMMENT TARGET PERSON 1401

COMMENT INFORMATION GENERATION DEVICE, AND COMMENT DISPLAY DEVICE

CROSS REFERENCE TO RELATED APPLICATIONS

This application claims the benefit of Japanese Application No. 2013-104547, filed on May 16, 2013, the disclosure of which application is incorporated by reference herein.

BACKGROUND OF THE INVENTION

1. Field of the Invention

The present invention relates to a comment-added video, and relates to a comment information generation device and a comment information generation method that generate comment information including a trajectory to implement a comment display tracking an object in a video as well as a comment display device and a program that display a comment tracking the object.

2. Background Art

Recently developed networks and widespread mobile phones allow a user of them to enjoy easily and usually a communication with the party at a remote place via a network using video contents and still-image contents. For instance, there is a service letting a plurality of users write their preferences and ideas as text on an existing content at a designated timing on the time axis of the contents. Such a communication using contents is expected to increase more in the future with the development of display devices and communication technologies. To implement such a communication, Patent Document 1 describes a technology of generating a video synthesized with a comment added by a user on a video (comment superimposition), and delivering the same over the Internet.

The system described in Patent Document 1 includes a video server and a comment storage/delivery server, and every comment that each user writes via a network is stored on the comment storage/delivery server, and is superimposed on a video for delivery while setting a reproduction time on the video including the comment written thereon as a reference point (hereinafter, such a video is called a "comment-added video"). Every time a video or a comment-added video is delivered and reproduced, a comment that is newly written by a user is associated with a time on the time axis of the video and is managed by the comment storage/delivery server. In their future delivery, these comments are basically delivered based on the time on the time axis of the video regardless whether they are old or new. Each comment is displayed so as to move on the video or at a constant position on the video in a fixed manner irrespective of the object to which the user posted the comment.

Patent Documents 2 and 3 disclose movie equipment to add text information to a video not via the Internet. Patent Documents 2 and 3 especially propose a method of displaying added text information with a balloon and changing the balloon in accordance with the movement of the object in the video, thus making the user's intention to add the text information understood easily.

Patent Document 4 discloses a chat system displaying a balloon. A balloon is displayed so as not to hide a face image of a user that is synthesized at a specified position on a common background or another displayed balloon.

Patent Document 5 discloses a technology to let a user of a mobile phone or a mobile terminal to input text information or illustration information to a video recording device using the mobile phone or the mobile terminal. The mobile phone or the mobile terminal is equipped with a comment tracking menu to make the tracking frame designated by a user track using a motion vector.

[Patent Document 1] Japanese Patent Application Laid-Open No. 2008-148071
[Patent Document 2] Japanese Patent Application Laid-Open No. 2010-244437
[Patent Document 3] WO 2010/116820
[Patent Document 4] Japanese Patent Application Laid-Open No. 2004-128614
[Patent Document 5] Japanese Patent Application Laid-Open No. 2009-81592

SUMMARY OF THE INVENTION

Such a conventional comment superimposition (or comment-added video generation) method, however, displays a comment at a position that does not relate to an object in the video. This makes it difficult for a viewer of the video to tell to which of the objects the subscriber of each comment assigns the comment. That is, since the comment-added video delivery site using the technology disclosed in Patent Document 1 has a limited number of letters that can be displayed on a line from one end to the other end of the screen, and its default setting is such that a comment consisting of a limited number of letters is scroll-displayed on the screen, and so it is hard for a viewer to tell to which the object the user actually wanted to add the data.

Meanwhile, a method of letting a comment to track an object so as to let a viewer know to which of the objects the comment is to be added has the following problem. That is, in the case of a method of estimating a trajectory of an object based on its image feature and displaying a comment along the estimated trajectory, such a comment is displayed only a time when "the object is viewable" after the comment is added to the object. In other words, when the scene changes or the object is shielded, then the comment will be deleted at timing that does not relate to the length of letters of the comment. That is, the comment easily may be deleted before the viewer finishes reading within the displaying time of the comment. "A comment moving to track an object" as in Patent Documents 2 to 5 can be easily implemented by finding the coordinates of the trajectory that is calculated from the estimation of the moving vector of the object as coordinates of "the comment moving to track". On the other hand, when the scene changes or the object tracked is shielded, a typical estimation of object movement will be interrupted in most cases because it loses a target to be tracked. In that case, the comment added to the object will be displayed in a shorter time, and so the user cannot read the comment during the displaying time of the comment, thus degrading the viewability of the comment.

In order to solve the aforementioned problems, it is an object of the present invention to provide a comment information generation device and such a method capable of improving viewability of comments, as well as a comment display device and a program.

A first aspect of the present invention is as follows. In this section, the invention refers to the invention described in the specification at the time of filing of the present application in Japan.

A comment information generation device includes: a video input section, to which a video is input; an information input section, to which positional information that a user inputs is input to display a comment so as to track an object in the video; an initial trajectory acquisition section that acquires an initial trajectory that is a trajectory of the object corresponding to the positional information; a trajectory extending section that acquires an extended trajectory by acquiring a following trajectory that is a trajectory having a starting point after an ending point of the initial trajectory, collecting a first comment assigned in a vicinity of the initial trajectory and a second comment assigned in a vicinity of the following trajectory, and connecting the following trajectory to the initial trajectory on a basis of the first comment and the second comment; and an output section that outputs the extended trajectory as comment information.

The "video" includes a video as well as a set of successive still images.

The "object" refers to components making up a video, such as a person, an object, background or a part of them in the video. This may be visually distinguishable or not.

The "comment" refers to information that a user inputs, including text information as well as image information such as pictograms, marks and characters.

The "positional information" refers to information such as a frame, a picture, a time and a coordinate in a frame, which is information to specify an absolute position or a relative position in an image.

The "acquisition" refers to operations, calculations and generation in its own device, and includes acquisition of a result from another device as well.

The "ending point of the initial trajectory" refers to a temporal back end of the initial trajectory, which may be specified with a corresponding frame or picture as well as with an absolute time or a relative time, for example.

The "after" includes the ending point of the initial trajectory as well as the ending point or later.

The "starting point of the following trajectory" refers to a temporal front end of the following trajectory, which may be specified with a corresponding frame or picture as well as with an absolute time or a relative time, for example.

The "connecting" includes a direct connection of the initial trajectory and the following trajectory as well as an indirect connection by a complement when there is an interval between them.

A second aspect of the present invention is as follows.

In the comment information generation device according to the first aspect, the trajectory extending section acquires the extended trajectory by calculating a plurality of the following trajectories, selecting at least one of the plurality of following trajectories on a basis of the first comment and the second comment, and connecting the selected following trajectory to the initial trajectory.

A third aspect of the present invention is as follows.

In the comment information generation device according to the second aspect, the trajectory extending section selects the following trajectory, to which the second comment having the highest similarity to the first comment is assigned.

The "similarity" refers to a degree of similarity of the meaning, the contents and the representation of the comment.

A fourth aspect of the present invention is as follows.

In the comment information generation device according to any one of the first to the third aspects, the trajectory extending section acquires a previous trajectory that is a trajectory preceding a starting point of the initial trajectory, and collects a first comment assigned in a vicinity of the initial trajectory and the previous trajectory.

The "starting point of the initial trajectory" refers to a temporal front end of the initial trajectory, which may include the case of starting from a point indicated with a frame, a picture, a time or a coordinate in a frame, to which a user assigns positional information as well as a point in the vicinity of them.

A fifth aspect of the present invention is as follows.

In the comment information generation device according to any one of the first to the third aspects, the trajectory extending section collects a comment that is posted more recently to collect the first comment or the second comment.

A sixth aspect of the present invention is as follows.

In the comment information generation device according to any one of the first to the third aspects, the trajectory extending section adds, for the first comment or the second comment, more weight to a word that is obtained by morphological classification from a comment that is posted at a date and a time closer to a time when the information input section receives a user's input, on a feature vector used for similarity calculation.

A seventh aspect of the present invention is as follows.

The comment information generation device according to any one of the first to the sixth aspects further includes a process selection section that, when a duration of the initial trajectory is less than a predetermined time, selects to perform processing at the trajectory extending section, and otherwise selects to output the initial trajectory as it is from the output section as the comment information.

The "predetermined time" includes a certain time as well as a time that is calculated in accordance with a certain rule.

An eighth aspect of the present invention is as follows.

In the comment information generation device according to any one of the first to the seventh aspects, the trajectory extending section determines whether a scene change or an event other than the scene change occurs after the ending point of the initial trajectory, and in accordance with a result of the determination, determines a region in the video, from which the following trajectory is to be acquired.

A ninth aspect of the present invention is as follows.

In the comment information generation device according to the eighth aspect, the region is narrower when it is determined that an event other than a scene change occurs than when it is determined that a scene change occurs.

A tenth aspect of the present invention is as follows.

In the comment information generation device according to the eighth aspect, when a variation in a brightness histogram of the video is a predetermined threshold or more, it is determined that a scene change occurs.

An eleventh aspect of the present invention is as follows.

In the comment information generation device according to the eighth or the ninth aspect, when it is determined that an event other than a scene change occurs, a trajectory other than that is continuous to a trajectory existing at a frame before the ending point of the initial trajectory is set as the following trajectory.

A twelfth aspect of the present invention is as follows.

In the comment information generation device according to the eighth or the ninth aspect, when it is determined that a scene change occurs, the following trajectory is acquired at the entire region of the video.

A thirteenth aspect of the present invention is as follows.

In the comment information generation device according to any one of the first to the twelfth aspects, the comment is further input to the information input section, and the output section outputs comment information and the comment to a display device.

A fourteenth aspect of the present invention is as follows.

In the comment information generation device according to the thirteenth aspect, the display device displays the comment during the predetermined time from an input time of the positional information in the video or during the predetermine time till the ending point of the initial trajectory, on a basis of the extended trajectory.

A fifteenth aspect of the present invention is as follows.

In the comment information generation device according to the thirteenth aspect, the output section determines whether a scene change or an event other than a scene change occurs after the ending point of the initial trajectory, and changes a display form of the comment in accordance with a result of the determination.

A sixteenth aspect of the present invention is as follows.

In the comment information generation device according to the thirteenth aspect, the output section differentiates a display form of the comment between a case where the object as a tracking target exists and a case where the object does not exist after the ending point of the initial trajectory, and outputs the resultant to the display device.

A seventeenth aspect of the present invention is as follows.

In the comment information generation device according to the sixteenth aspect, when there is a temporal interval between the ending point of the initial trajectory and the starting point of the following trajectory, the output section does not display the comment during the temporal interval.

An eighteenth aspect of the present invention is as follows.

A comment display device receives the comment information from the comment information generation device according to any one of the first to the twelfth aspects, and displays the video and the comment.

A nineteenth aspect of the present invention is as follows.

A comment information generation method includes the steps of: a video input step of inputting a video; an information input step of inputting positional information that a user inputs to display a comment so as to track an object in the video; an initial trajectory acquisition step of acquiring an initial trajectory that is a trajectory of the object corresponding to the positional information; a trajectory extending step of acquiring an extended trajectory by acquiring a following trajectory that is a trajectory having a starting point after an ending point of the initial trajectory, collecting a first comment assigned in a vicinity of the initial trajectory and a second comment assigned in a vicinity of the following trajectory, and connecting the following trajectory to the initial trajectory on a basis of the first comment and the second comment; and an output step of outputting the extended trajectory as comment information.

A twentieth aspect of the present invention is as follows.

A program makes a computer execute the comment information generation method according to the nineteenth aspect.

The "acquisition" refers to, in the case of a program, operations, calculations and generation by its own program, and includes acquisition of a result from other programs such as library and an OS in a device to perform a video processing as well.

The present invention can generate comment information capable of improving viewability of a comment.

The invention expressed in a more specific concept enables generation and display of comment information without interrupting a tracking comment and losing the viewability of a comment even when a scene changes or the subject is shielded.

DESCRIPTION OF THE PREFERRED EMBODIMENTS

The following describes a comment information generation device and a comment display device according to one embodiment of the present invention in details, with reference to the drawings.

The following embodiments illustrate specific examples of the present invention. This means that the numerical values, shapes, components, disposed positions and topologies of the components, steps, the order of steps shown in the following embodiments are just examples, which are not intended to limit the scope of the prevent invention. Those components in the following embodiments, which are not recited in the independent claims that define the most generic concept, are each described as an arbitrary component.

First Embodiment

Figure 1:
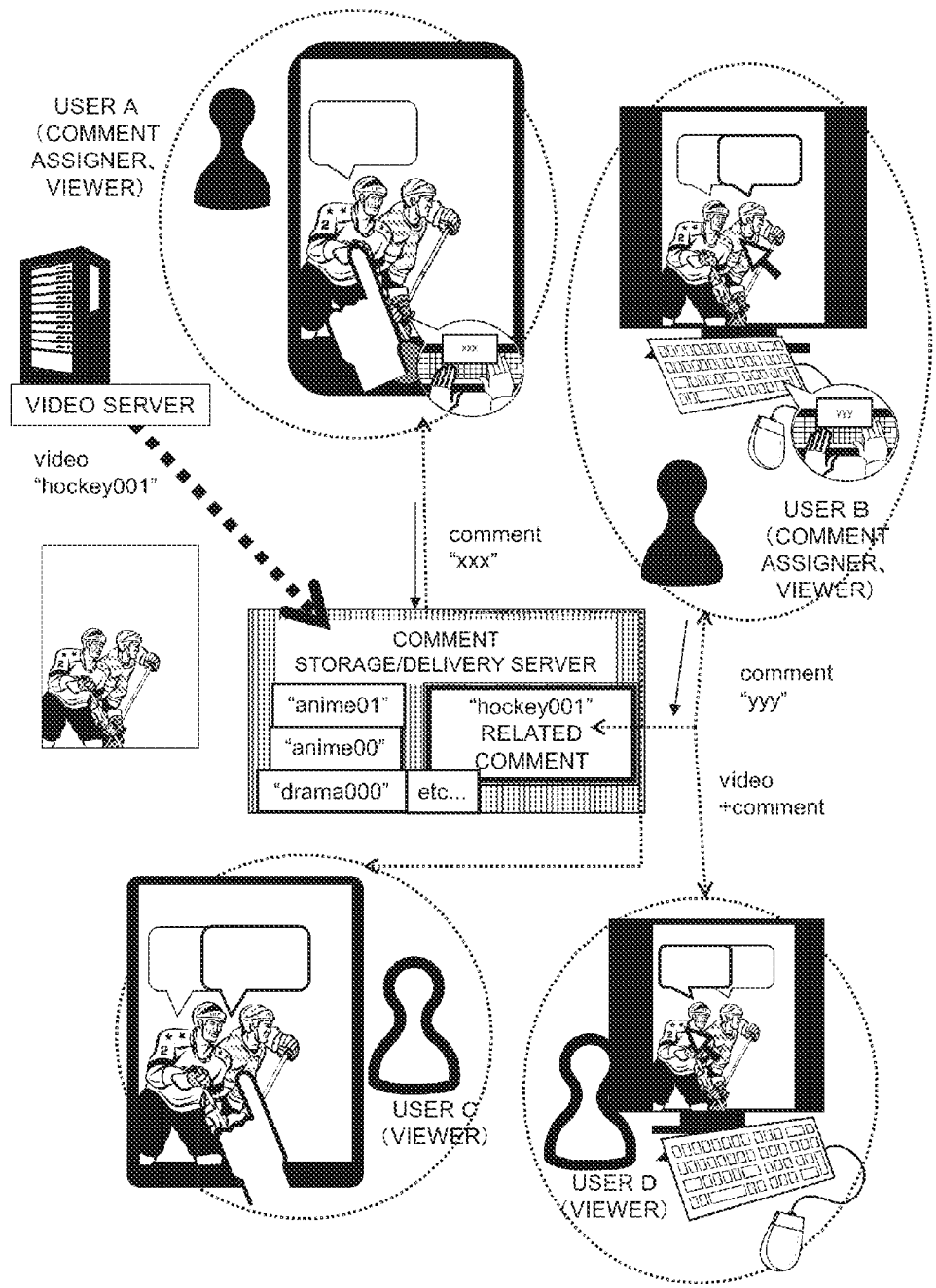
FIG. 1 describes the configuration of a comment-added video delivery system that is one embodiment of the present invention.

FIG. 1 shows the configuration of a comment-added video delivery system as a target of the present embodiment. Similarly to Patent Document 1, the comment-added video delivery system is provided with a video server and a comment storage/delivery server. The comment information generation device of a first embodiment may be implemented with a user's terminal, in a video server or a comment storage server or with other servers.

Different Users A to D shown in FIG. 1 view videos delivered to their holding terminals (smartphones, PCs, tablet PCs or the like) via a network. The drawing shows the example where User A and User B assign comments to a video using a keyboard or a software keyboard provided in their terminals. The comments here are text information, and are assigned in association with positional information designated by the users, in this case in association with temporal positions (i.e., a determined time or frame number) in the video and spatial positions (i.e., coordinates). In the following description, videos may refer to video data or videos indicated by video data.

A comment assigned by a user is stored in the comment storage/delivery server, whenever necessary, together with information such as a video, to which the comment is assigned, a user ID of the user, a time and coordinates (in the video) with which the comment is associated and an actual time when the comment was posted. Then, after User A and User B assign comments to a certain video, when other User C and User D view the video, the comments of User A and User B are delivered from the comment storage/delivery server similarly to other comments associated with the video, and a video synthesized with the comments thereon is displayed based on the information (e.g., time on the video that is time elapsed on the video and coordinates) associated with the comments.

Figure 2:
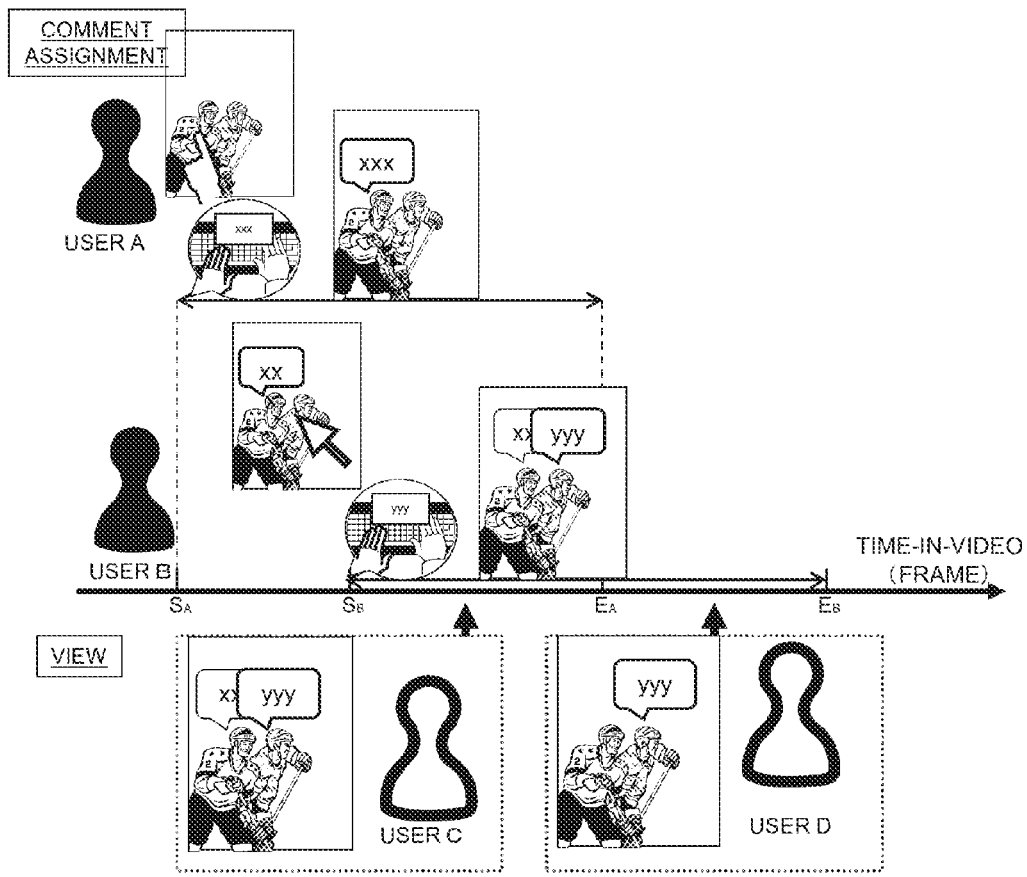
FIG. 2 describes the time flow relating to comment assignment to a video in one embodiment of the present invention.
Figure 2:

FIGS. 2A and B show temporal flows of comment assignment to a video.

Firstly FIG. 2A shows a relationship between the time flow in the video and displayed comments. Comments are associated with time-in-image (reproduction time of the video) and are stored in the server. It is desirable that each comment is displayed during a predetermined duration suitable for the viewing of the comment. Calculation of the duration will be described later in details.

FIG. 2A shows that the comment by User A is displayed from SA second to EA second as the time-in-image, and the comment by User B is displayed from SB second to EB second (instead of seconds, this may be found with frames). The following describes "seconds" as the units of time, and instead, "the number of frames" may be used.

FIG. 2B shows the flow of actual date and time. As shown in FIG. 2B, after User A and User B assign (write) comments, User C or User D views the comment-added video. Then, when User C views the video of the comment-added video at the time-in-image from SB second to EA second, then User C can view the comment-added image, on which the comment by User B is superimposed on the comment by User A as shown in FIG. 2A. When User D views the video at the time-in-image from EA second to EB second, then User D can view the video, on which the comment by User B only is assigned as shown in FIG. 2A.

That is a conceptual description of the comment-added video as a target of the present embodiment.

Figure 3:
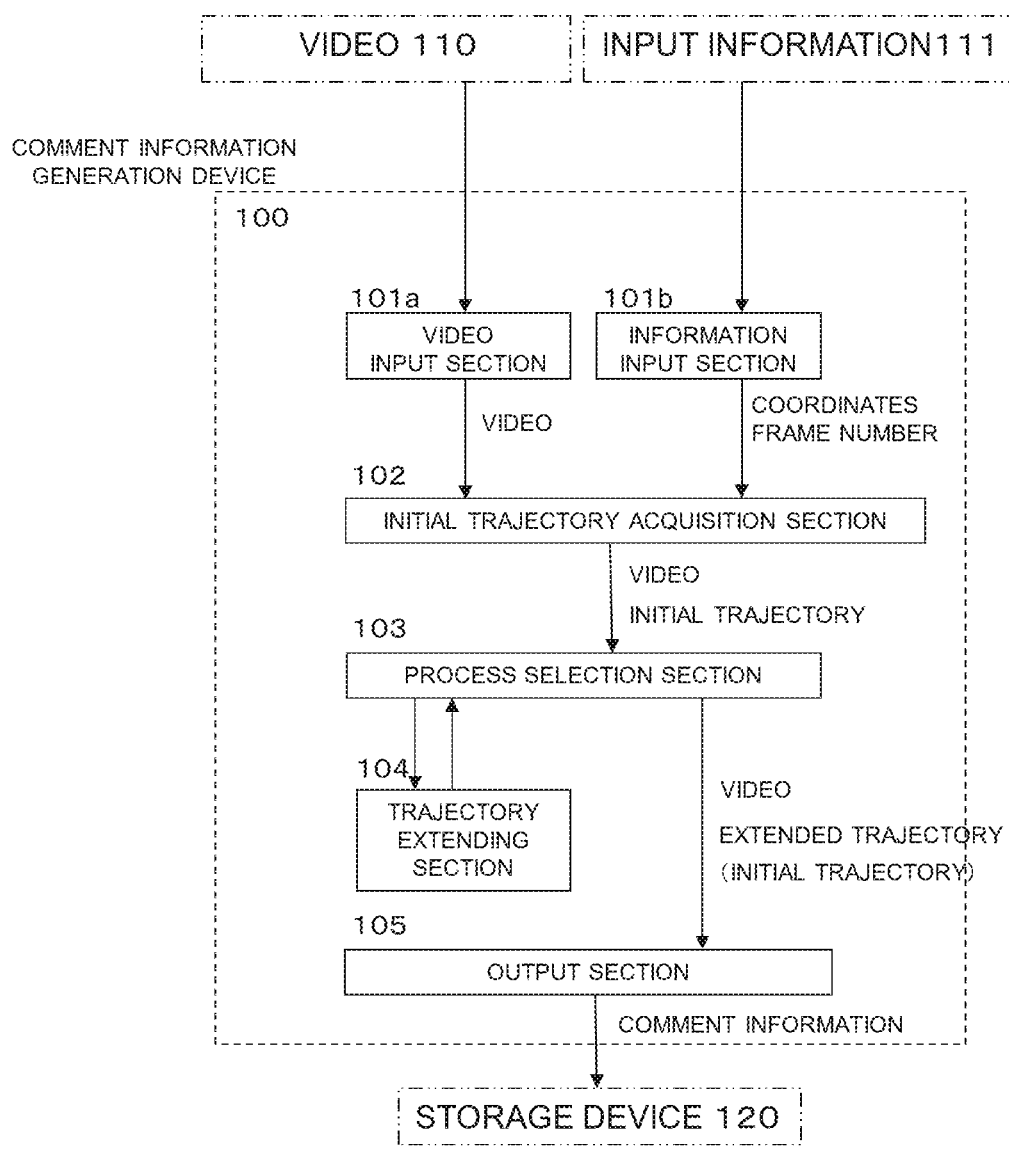
FIG. 3 shows the configuration of a comment information generation device that is one embodiment of the present invention.

FIG. 3 is a block diagram showing the functional configuration of a comment information generation device 100 according to the present embodiment. As shown in FIG. 3, the comment information generation device 100 calculates a trajectory that is a motion of an object to be tracked in a comment-added video, and includes a video input section 101a, an information input section 101b, an initial trajectory acquisition section 102, a process selection section 103, a trajectory extending section 104 and an output section 105.

The comment information generation device 100 receives, as input, a video 110 and input information 111 containing user's designated coordinates on the video and positional information relating to frames, generates a trajectory (initial trajectory or extended trajectory) including the motion of pixels or a subject as an object in the video 110 designated by the user, and outputs the same as comment information to a storage device 120.

The video input section 101a receives an input of a video or pictures (they may be called "images" as well) that are a plurality of pieces of still images making up a video. The video input section 101a may be an interface, for example, that reads a video stored in a storage device such as a video server directly or via a communication path.

The information input section 101b receives an input of the input information 111 that contains frames and coordinates that are positional information that the user inputs with the intention of displaying a comment to track an object in the video. A method to input information to the information input section 101b can be implemented by reading information directly or via a communication path, the information relating to time, coordinates and the like on the video that a user inputs by clicking a mouse or touching a touch panel, for example. When the comment information generation device 100 is implemented in a server, the input information 111 is input to the information input section 101b from a user's terminal via a communication line.

The initial trajectory acquisition section 102 calculates a trajectory of an object on the basis of the video 110 received by the video input section 101a and the input information 111 received by the information input section 101b, and in this case, calculates an initial trajectory that is a result of estimation of the object motion.

When the duration of the initial trajectory calculated by the initial trajectory acquisition section 102 is shorter than a predetermined time, the process selection section 103 selects to input the initial trajectory to the trajectory extending section 104 to perform trajectory extension procedure. Otherwise the process selection section 103 selects to output the initial trajectory to the output section 105.

The trajectory extending section 104 finds a previous trajectory that is calculated back to the early direction in the time axis of the video from the coordinates of the starting point of the initial trajectory, and inquiries a plurality of comments (first comments) assigned in the vicinity of the initial trajectory and the previous trajectory from the comment server for collection.

The trajectory extending section 104 further finds a following trajectory that is calculated in the late direction in the time axis of the video from any coordinates of a frame after the ending point of the initial trajectory, and collects a comment assigned in the vicinity of the following trajectory as a second comment.

Then when the first comment and the second comment are sufficiently similar, the following trajectory is connected after the initial trajectory, thus extending the initial trajectory to generate an extended trajectory, and the extended trajectory is output to the output section.

More desirably, the trajectory extending section 104 acquires coordinates by performing arbitrary sampling from coordinates of a nearby frame that is after the ending point of the initial trajectory and having a temporal interval from the ending point of the trajectory that is within a predetermined constant number of frames, and finds a plurality of following trajectories that are calculated in the later direction in the time axis of the video. Then the trajectory extending section 104 collects a plurality of comments assigned in the vicinity of such following trajectories as second comments from the comment server, and selects a following trajectory corresponding to the second comment that is the most similar to the first comment and connects it after the initial trajectory, thus extending the initial trajectory to generate an extended trajectory, and outputs the extended trajectory to the output section 105.

Arbitrary sampling from coordinates of a nearby frame does not have to be performed necessarily for coordinates to find a following trajectory. For instance, when the device has remaining power, all of the coordinates of all of the following frames may be processed for finding. Such a way can yield more candidates, and leads to the possibility of extending a trajectory more correctly. When it is understood beforehand that the scene does not change, a following trajectory may be found for coordinates existing in the vicinity that is within a constant distance from the ending point of the initial trajectory. Such a way can suppress the memory capacity during processing.

The output section 105 outputs, as comment information, the initial trajectory or the extended trajectory generated by the initial trajectory acquisition section 102 or the trajectory extending section 104 to the storage device 120 provided in the comment storage/delivery server in a wired or wireless manner. The comment information contains information on a comment, such as coordinates where the comment is assigned, a comment posting time, and a comment display time. The comment information further may contain text information of a comment assigned to a video and the shape or the size of the comment to display the comment.

The output section 105 outputs the comment information to other devices such as, when the comment information generation device 100 is implemented by a user's terminal, an image display device in the same device, or when the comment information generation device 100 is implemented with a server, a comment display device that is a user's terminal device that issues a request of video delivery.

The process selection section 103 is an arbitrary configuration. Such a process selection section 103 can eliminate the necessity to perform trajectory extending process to every initial trajectory, and so the comment information generation device 100 capable of performing effective processing can be achieved.

Alternatively, the operation condition of the process selection section 103 may be other conditions. Exemplary conditions may be to set different frequencies of the trajectory extending process depending on whether the resource to perform processing has remaining capacity or not.

Figure 4:
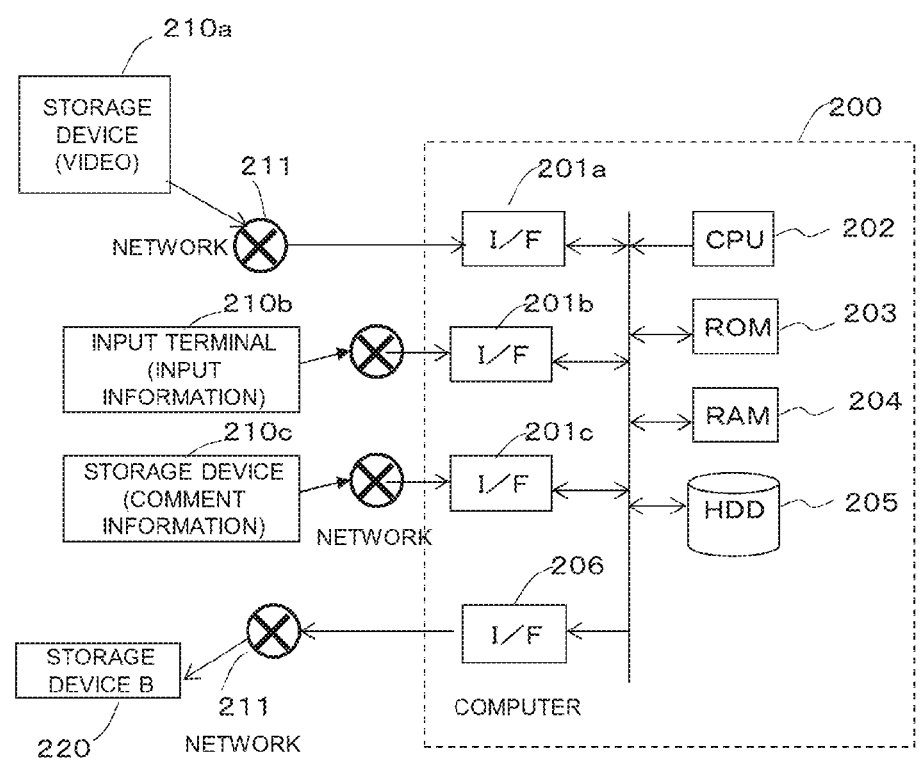
FIG. 4 shows the configuration of the comment information generation device that is one embodiment of the present invention, which is configured with a computer.

The various components making up the comment information generation device 100 (the video input section 101a, the information input section 101b, the initial trajectory acquisition section 102, the process selection section 103, the trajectory extending section 104 and the output section 105) may be implemented with software such as a program executed on a computer, or may be implemented with hardware such as an electronic circuit or an integrated circuit. FIG. 4 shows the hardware configuration of the comment information generation device 100 of the present embodiment that is configured with a computer.

In FIG. 4, a storage device 210a outputs a stored video 110 to an I/F (interface) 201a. An input terminal 210b receiving an input from a user outputs input information 111 to an I/F 201b. A storage device 210c storing comments outputs first comment information and second comment information to an I/F 201c. A computer 200 acquires the video 110 and the input information 111 to perform comment information generation processing. A storage device B220 acquires comment information generated by the computer 200 and stores the same.

The computer 200 includes the I/Fs 201a, 201b, and 201c, a CPU 202, a ROM 203, a RAM 204, a HDD 205 and an I/F 206. A program to let the computer 200 operate is held beforehand in the ROM 203 or the HDD 205. The program is read by the CPU 202 as a processor from the ROM 203 or the HDD 205 onto the RAM 204 for decompression. The CPU 202 executes various encoded instructions in the program that are decompressed at the RAM 204. The I/Fs 201, 201b and 201c fetch the video 110, the input information 111 and stored comments, respectively, into the RAM 204 in response to the execution of the program. The I/F 206 outputs comment information generated by the execution of the program, and stores the same in the storage device B220.

The computer program may be stored not only in the ROM 203 or the HDD 205, which are semiconductors, but also in a CD-ROM, for example. It may be transmitted via a wired or wireless network or via broadcasting, and may be fetched into the RAM 204 of the computer.

The computer 200 may be a terminal that a user uses or a server that transmits comment information to a user's terminal. In the case of a server, comment information may be transmitted in response to a user's request or may be transmitted at one time to specified or unspecified user's terminals irrespective of requests.

Figure 5:
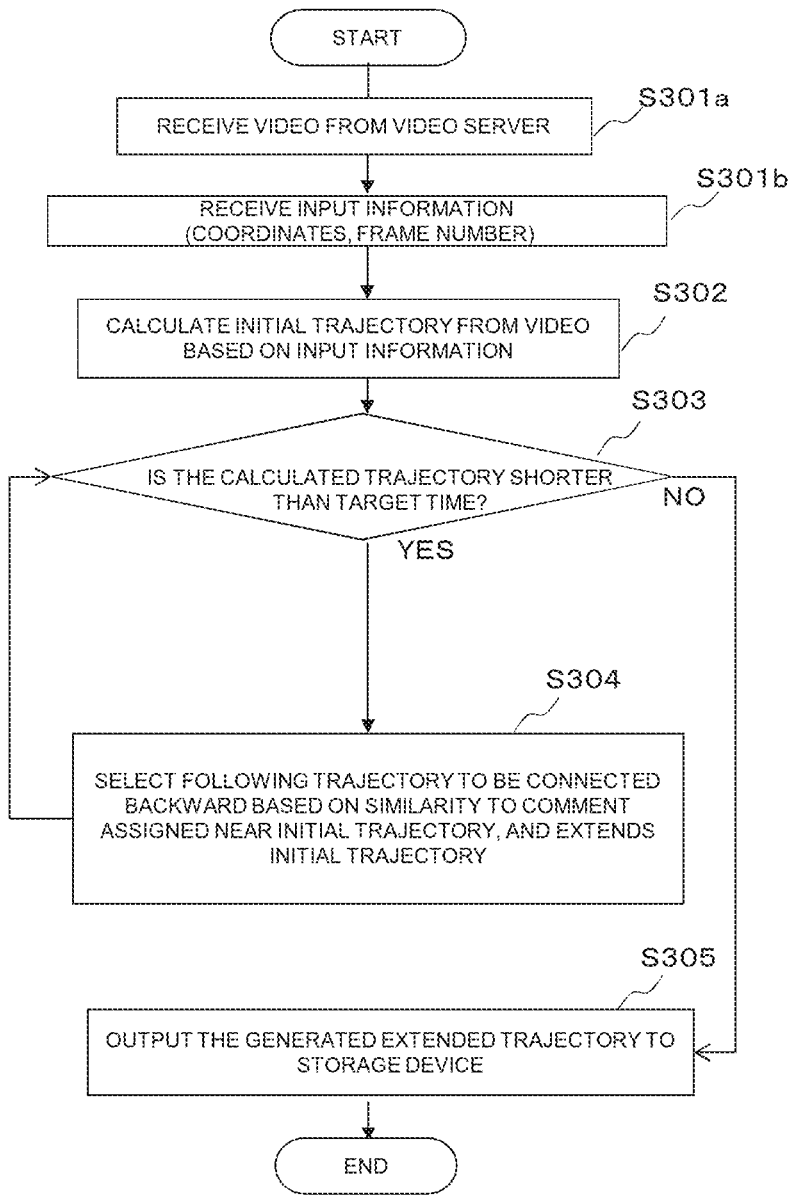
FIG. 5 is a flowchart showing the operation of the comment information generation device in one embodiment of the present invention.

Referring now to FIG. 5 or later, the following describes an operation of the comment information generation device 100 of the present embodiment. FIG. 5 is a flowchart showing the operation of the comment information generation device 100 of the present embodiment.

In FIG. 5, six steps S301a to S305 correspond to processing sections 101a to 105, respectively, of FIG. 3. That is, the video input section 101a executes a video input step S301a, the information input section 101b executes an information input step S301b, the initial trajectory acquisition section 102 executes an initial trajectory acquisition step 302, the process selection section 103 executes a process selection step S303, the trajectory extending section 104 executes a trajectory extending step S304, and the output section 105 executes an output step S305.

Firstly, the video input section 101a executes the video input step S301a. The video input section 101a acquires a video 110.

The present embodiment assumes, as the video 110 that the video input section 101a acquires, broadcasted videos, videos that are shot as a personal-use movie, and a plurality of pictures (images) making up a video. These videos 110 are stored in a video server and the like, and the video input section 101a acquires the video 110 via a wired or wireless network or via broadcasting. In the present embodiment, the video is at 30 frames/sec.

Figure 6:
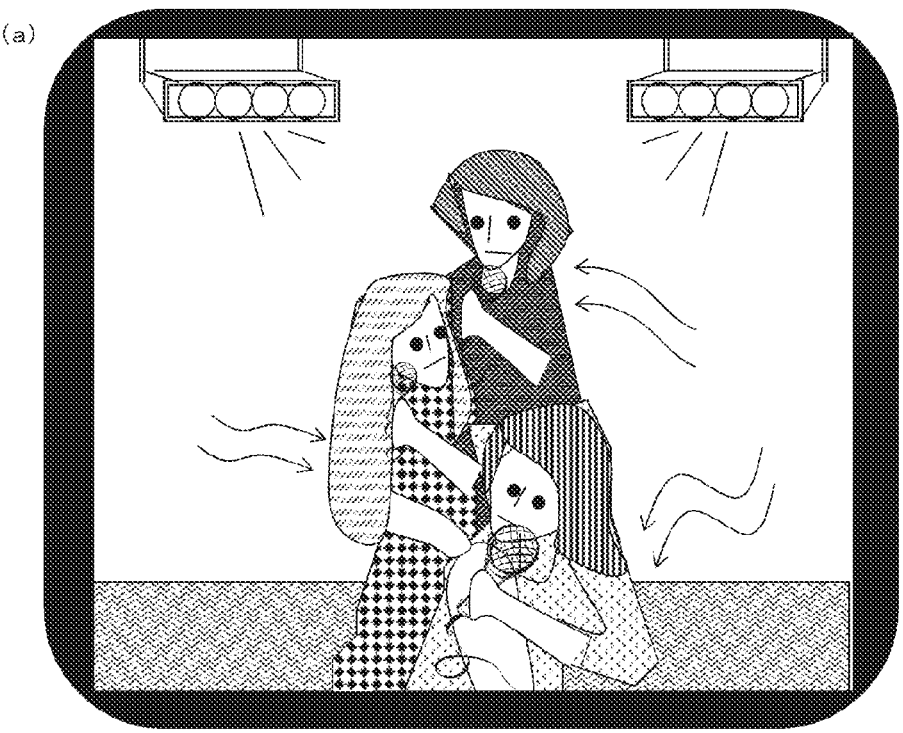
FIG. 6 describes an exemplary video and a subject region in the video in one embodiment of the present invention.
Figure 6:
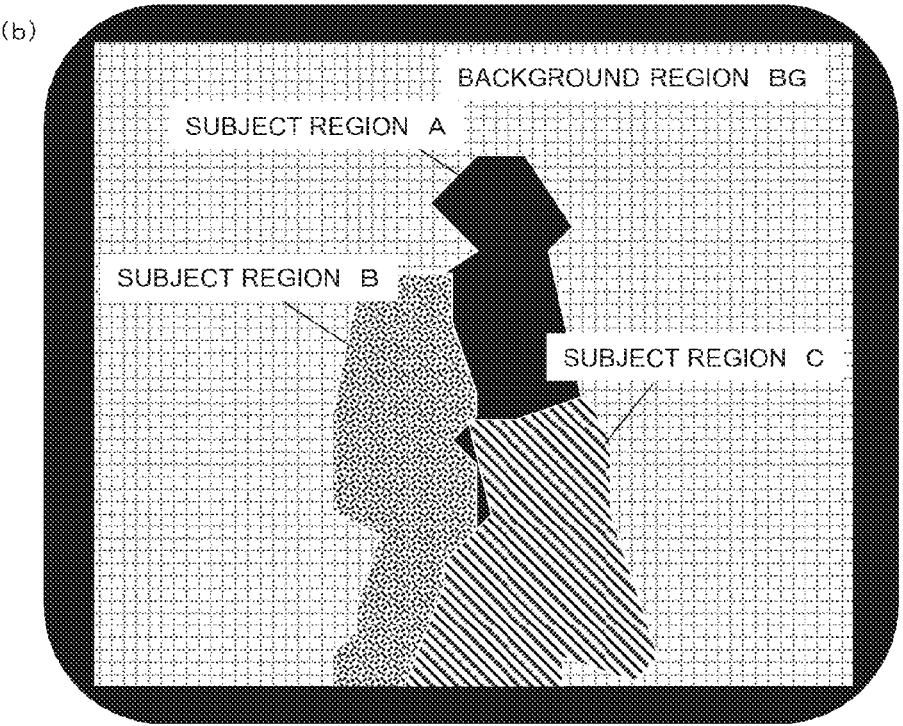

FIG. 6A shows an exemplary video acquired. This case shows an example of video contents relating to music, and the video as a target of the present invention is not limited thereto. As in FIG. 6B, the following uses a simplified display of a subject region as the exemplary video for sake of simplicity of the description and the drawing.

Figure 7:
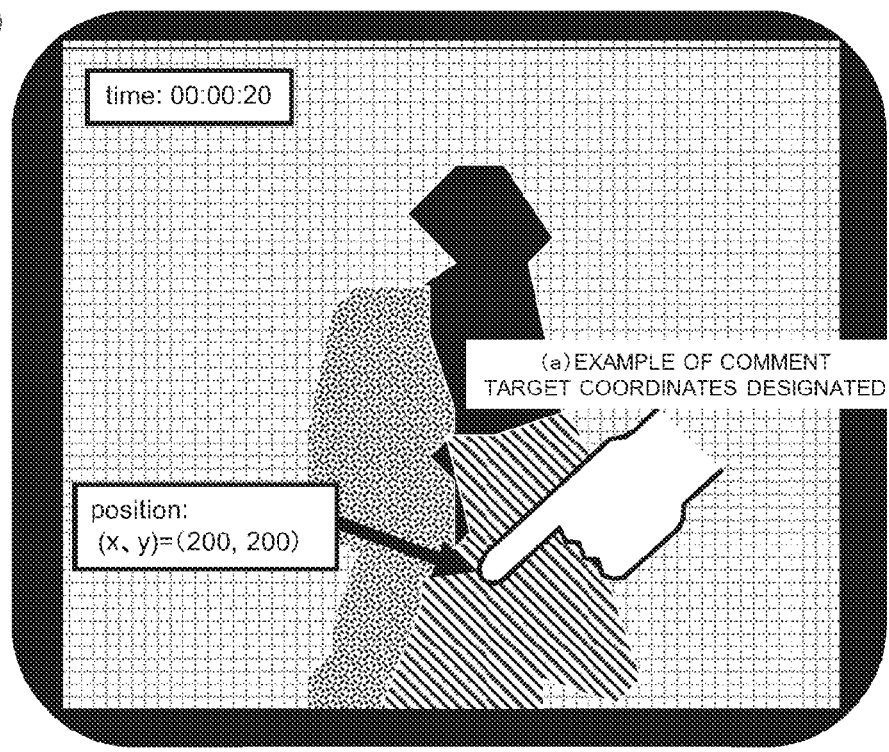
FIG. 7 describes the case where a user inputs a comment on a video in one embodiment of the present invention.

Next, the information input section 101b executes the information input step S301b. The information input section 101b acquires input information 111. FIG. 7 shows exemplary input information 111 acquired.

As shown in FIG. 7A, the acquired input information 111 contains at least two types of information of time and coordinates (position). The time is information indicating elapsed time (reproduction time) in the video 110, and instead of temporal information, other information such as a frame number may be used, as long as the information can specify timing when the user assigns the comment. The coordinates also may be other information such as coordinate values that are normalized so that vertical and horizontal ranges of the screen become 1 instead of coordinate values of a pixel, as long as the information can specify a spatial position where the user assigns the comment in the frame.

As in FIG. 7B, the input information 111 may contain a comment, in addition to time and positional information including coordinates.

Such information may be input via a user interface on a device such as a PC or a mobile terminal. Alternatively, the information may be input by receiving positional information of an object, for example, via a communication line through an operation performed using a user interface on a device such as a PC or a mobile terminal.

Next, the initial trajectory acquisition section 102 executes the initial trajectory acquisition step S302.

The initial trajectory acquisition section 102 calculates coordinate values (initial trajectory) along a series of time axis that is a motion of an object as a target followed by a user, on the basis of the input information 111 that the information input section 101b receives and the video 110 that the video input section 101a receives. Hereinafter a still image for each frame making up a video is called a picture.

Specifically, the initial trajectory acquisition section 102 inputs a plurality of pictures from the video input section 101a, detects corresponding points among the pictures, and generates a trajectory including a specific coordinate on a picture of a specific frame as a starting point for outputting. That is, the initial trajectory acquisition section 102 detects a motion of a pixel or a block including pixels between two temporally neighboring pictures that make up the video 110 and couples the detected motion for the plurality of pieces of pictures. The thus obtained coordinate values along a series of time axis are called a trajectory.

Figure 8:
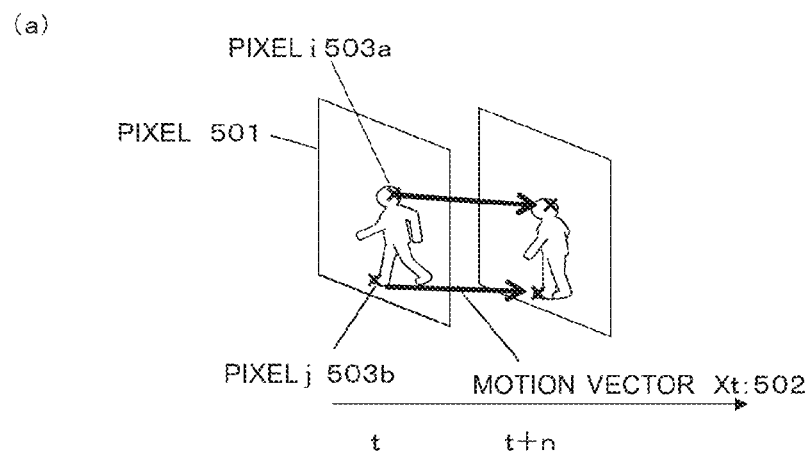
FIG. 8 describes how to calculate a trajectory by an object motion estimation section in one embodiment of the present invention.
Figure 8:
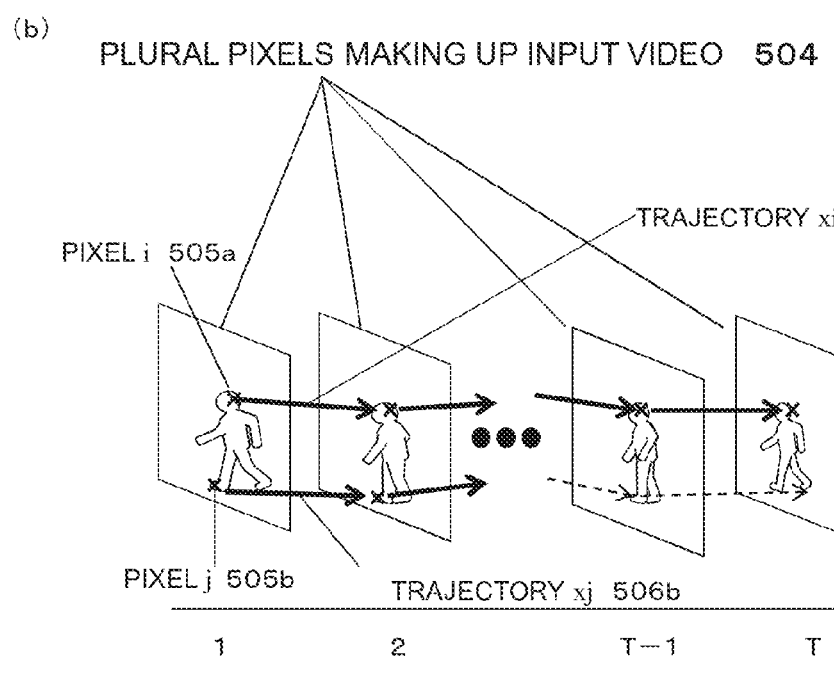

As shown in FIG. 8A, the initial trajectory acquisition section 102 uses motion vector information 502 between two pictures that is calculated based on a pixel i503a and a pixel j503b of an input picture 501 at time t, and tracks the motion of the pixel i503a and the pixel j503b, thus finding corresponding points of the pixel i503a and the pixel j503b. At this time, the initial trajectory acquisition section 102 calculates an initial trajectory xi as in Expression 1 from coordinate values (x1$^i$, y1$^i$) of a certain pixel i on one frame of a picture and coordinate values (xt$^i$, yt$^i$) of the corresponding point of the pixel i at time t.

[Math. 1]

$$x^i = (x_1^i, y_1^i, \ldots, x_t^i, y_t^i, \ldots, x_T^i, y_T^i)$$ (Expression 1)

In the present embodiment, the initial trajectory x$^i$ includes corresponding points across T pieces of pictures from frame 1 to frame T. The initial trajectory is represented by coordinate values as stated above, or may be represented by vectors with reference to a predetermined point.

FIG. 8B shows an exemplary initial trajectory. The video 110 input to the initial trajectory acquisition section 102 is made up of T pieces of pictures 504. Then trajectories x$^i$506a and x$^j$506b are aggregate of corresponding points of the pictures from frame 2 to frame T corresponding to certain pixel i505a and pixel j505b of frame 1. The trajectories x$^i$506a and x$^j$506b are represented by vectors including picture coordinate values of the pictures as elements. Herein, corresponding pixels on the (T−1) pieces of pictures from frame 2 to frame T are found with reference to all pixels (I pieces) on the picture of frame 1.

Instead of finding corresponding points of all pixels across the pictures to find corresponding points across the pictures, the initial trajectory acquisition section 102 may find corresponding points of a plurality of neighboring pixels (block) in the pictures. The present embodiment describes the processing in the units of pixels, and for the processing in the units of blocks (region) including a plurality of pixels, (i) a pixel value may be summed in a block, (ii) the average of pixel values may be found in a block, or (iii) the median value of pixel values may be found in a block, whereby data (representative value) corresponding to the block may be found, and the processing may be performed using the thus found representative value similarly to the processing in the units of pixels. The present embodiment does not distinguish the case where a certain corresponding point is found for each pixel or the case where one corresponding point is found for a plurality of pixels. A trajectory of a pixel i may include both of the case where a pixel i in a certain picture corresponds to the corresponding point in another picture and the case where a block i in a certain picture corresponds to the corresponding point in another picture.

To find corresponding points between pictures, the frames do not have to be necessarily in succession, and for instance, two pictures input at time t and time t+n may be used to find a trajectory. Herein, n is an integer of 1 or more. A specific method to calculate corresponding points among a plurality of pictures as stated above may be a method disclosed in Non-Patent Document 1 or Non-Patent Document 2. These methods calculate a motion vector by calculating the optical flow. Non-Patent Document 1 calculates the optical flow on the basis of a hierarchical block matching. Since the method uses smoothness between pixels as a restraint condition, the optical flow obtained can have a motion vector that changes smoothly between neighboring optical flows. When there is no special abrupt motion or shielding, corresponding points can be found effectively and correctly. Further the reliability of estimation also can be calculated, and so corresponding points having reliability lower than a threshold value may be removed in the subsequent processing as described later, whereby the ratio of erroneous motion vectors to all of the motion vectors can be reduced.

On the other hand, Non-Patent Document 2 discloses a method to calculate an optical flow using graph cuts. This method is computationally expensive, but it can find precise corresponding points densely on a picture. This method performs bidirectional searching, and estimates that corresponding points having a correlation lower than a threshold value are pixels in a shielding region. This can remove the corresponding points located at the shielding region in the subsequent processing. As a result, the ratio of erroneous motion vectors to all of the motion vectors can be reduced.

At this time, motion information may be found for all of the pixels. For speedy processing, a picture may be segmented into grids, and motion information may be found only for pixels on grids at constant intervals, or pictures may be segmented into blocks as stated above, and motion information may be found for each block.

In this case, a method of assuming the translational motion of the block can be used to calculate a motion vector. Especially for a rotating object, a method of assuming affine deformation disclosed in Non-Patent Document 3 instead of the translational motion may be used, whereby the motion of pixels can be estimated more precisely.

Non-Patent Document 1: P. Anandan, "A Computational Framework and an Algorithm for the Measurement of Visual Motion", International Journal of Computer Vision, Vol. 2, pp. 283-310, 1989

Non-Patent Document 2: Vladimir Kolmogorov and Ramin Zabih, "Computing Visual Correspondence with Occlusions via Graph Cuts", International Conference on Computer Vision, 2001

Non-Patent Document 3: Jianbo Shi and Carlo Tomasi "Good Features to Track", IEEE Conference on Computer Vision and Pattern Recognition, pp 593-600, 1994

When a motion vector is calculated by the technology disclosed by Non-Patent Document 1, reliability can be calculated. Then, pixels having reliable motion information only may be used. When a motion vector is calculated by the technology disclosed by Non-Patent Document 2, shielding can be estimated, and so motion information on pixels that are not shielded only may be used.

Next, the process selection section 103 executes the process selection step S303. The process selection section 103 decides the subsequent processing on the basis of the trajectory received from the initial trajectory acquisition section 102 or the trajectory extending section 104 and a predetermined time that is a predetermined target time.

Specifically, when the number of successive frames in the initial trajectory is the same as the number of frames corresponding to the predetermined time or longer than the predetermined time, there is no need to extend the trajectory. Then, the process selection section 103 passes the initial trajectory to the output section 105 as it is. On the other hand, when the number of successive frames in the initial trajectory is less than the number of frames corresponding to a predetermined time separately provided, the initial trajectory has to be extended to ensure the viewability of the comment. Then, the process selection section 103 passes the initial trajectory to the trajectory extending section 104.

The number of frames corresponding to the predetermined time may be found during execution. The number of frames may be found using the frame rate of the video. For instance, since the frame rate is typically 30 fps, the number of frames corresponding to a predetermined time will be Ta×30 where Ta denotes a predetermined time (seconds). For the predetermined time, when the maximum number of letters that is allowed to input as a comment is determined beforehand as in tweets in Twitter (registered mark) or mixi (registered mark), a predetermined time corresponding to the maximum number of letters can be calculated for use. For instance, when it is determined as ¼ second per letter in line with the guideline of subtitles in movies, then the predetermined time corresponding to the same number of letters as in Twitter will be 144×¼=36 seconds. Alternatively, since comments for a video are typically not so long, a typically available standard, which is used in a video service such as niconico douga (registered mark) to assign not-following comments, may be used. In this case, the predetermined time may be set at 3 seconds.

The predetermined time may be found during execution, instead of setting it beforehand. Alternatively, the predetermined time may be found in proportion to the length of an input comment. For instance, when the input information 111 received by the information input section 101b includes a comment input by a user, a predetermined time may be calculated as a time necessary to allow the user or other users to view this comment.

For instance, a predetermined time to display a comment so as to track an object, that is, an appropriate target time may be calculated that is good to display a comment included in the input information 111 on the basis of the input information 111 received by the information input section 101b. The predetermined time may be determined on the basis of the number of letters in the comment, for example.

For instance in the case of subtitles in movies or the like, they establish independent guidelines that "four letters are displayed per second". Using this guideline that is the most common, the minimum required time to display a comment "WWW" shown in FIG. 7B, 18A or 18B will be ¾=0.75 second. This corresponds to 23 frames in the case of the video 110a at 30 fps (fraction is rounded up). That is, the motion of a pixel or an object designated by a user may be tracked during 23 frames. That is, the predetermined time may be calculated in the form of a time as in "0.75 second" or may be calculated in the form of frame lengths as in 23 frames. Exchange between the form of frame length and the form of time is possible using frame rate information of the video 110a, for example, as long as the process selection section 103 can be informed always about which form is used.

The predetermined time may be found in the units of words. For instance, in the case of English sentences, the units of WPM (Words per minute: the number of words that can be read per minute) may be used as a speed for reading sentences. Since it is typically said that adult Americans can read magazines, newspapers and books at the speed of 250 to 300 WPM, this criterion may be used to calculate the target time.

That is, when English sentences are input, WPM may be used to calculate a predetermined time. For instance, the target may be set at 200 WPM, for example, by giving a margin between words for easiness to read. The number of words W may be found by detecting spaces in the input comment sentences. In this way, the predetermined time Nw (sec.) can be found by calculation as in Nw=W×60/200.

It is said that it takes about 0.5 second for a person to recognize something visually. Considering this, it is desirable that the predetermined time always has a predetermined length (e.g., 0.5 second) or longer whether it uses the aforementioned rule of "four letters per second" or uses WPM.

When a user inputs a comment on a frame where another comment has been already displayed, a predetermined time for the newly input comment may be calculated longer so as to allow a viewer to view both of the past comment text information displayed and the comment text information that the user inputs newly. The predetermined time may be calculated while adding a predetermined number of letters or number of words to the number of letters or the number of words of the new comment. This allows a user who views a comment-added video to view the comment sentences displayed simultaneously with reliability.

When a user tries to assign a comment on a frame, another comment including the same letter string may be already on the frame. Such a case may make a viewer discomfort because of the redundancy of the overlapped comment contents. Then, as the number of comments having the same content existing on a frame increases, the predetermined time for a comment having the same content that is newly added may be set shorter or made zero. To shorten the predetermined time, the predetermined time found based on the number of letters may be changed into a value obtained by dividing by the number of the same comments, for example. Even when the same comment is not assigned to one frame, if some comments appear a plurality of times in one video, the predetermined time for such a comment may be shortened or made zero in a similarly manner.

The process selection step S303 is an arbitrary processing step as described for the process selection section 103.

When the process selection step S303 selects the processing of the trajectory extending step S304, the trajectory extending section 104 executes the trajectory extending step S304.

The trajectory extending section 104 performs the processing to extend the initial trajectory received from the process selection section 103, and outputs the resulting extended trajectory to the process selection section 103 again.

Figure 9:
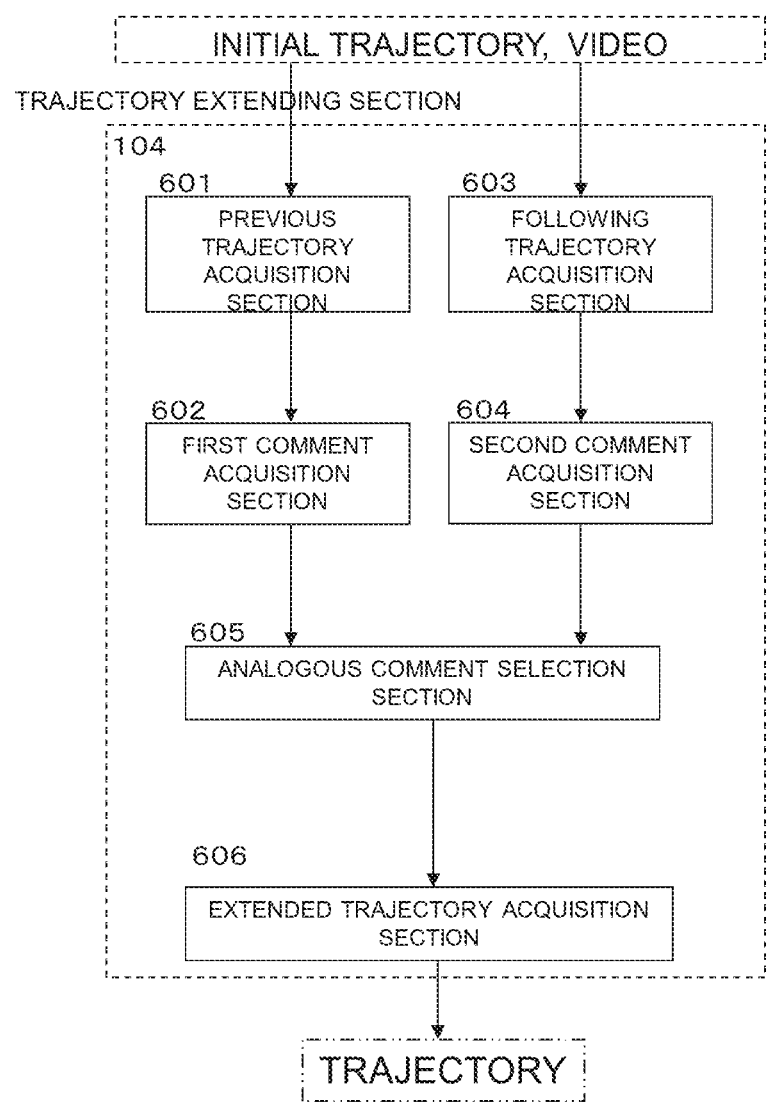
FIG. 9 shows the configuration of a major part of a trajectory extending section in one embodiment of the present invention.

FIG. 9 shows the configuration of the trajectory extending section 104. The trajectory extending section 104 includes a previous trajectory acquisition section 601, a first comment acquisition section 602, a following trajectory acquisition section 603, a second comment acquisition section 604, an analogous comment selection section 605 and an extended trajectory acquisition section 606.

Figure 10:
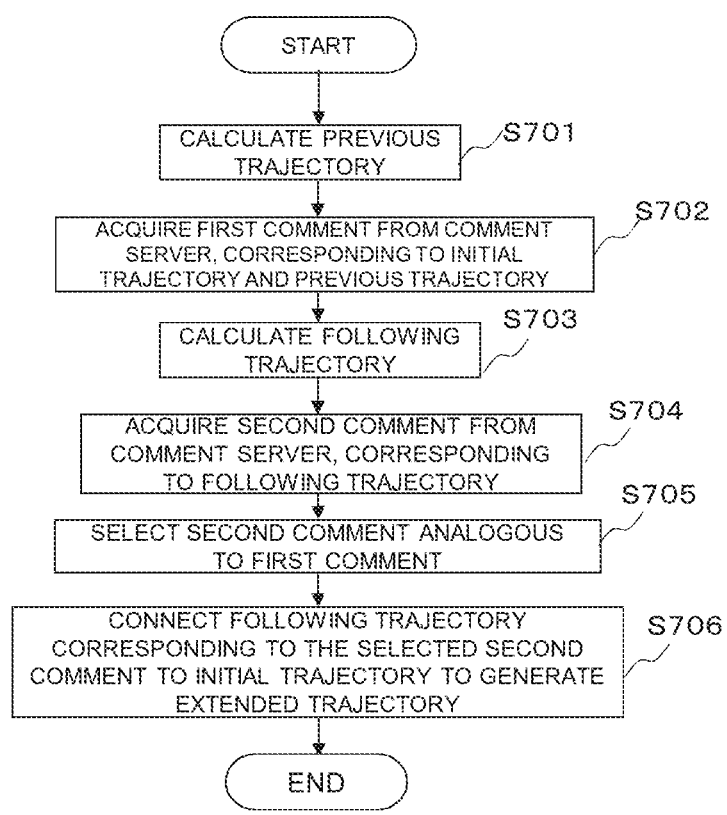
FIG. 10 is a flowchart showing the operation of the trajectory extending section in one embodiment of the present invention.

The following describes an operation of the trajectory extending section 104, with reference to FIG. 10. FIG. 10 is a flowchart showing the operation of the trajectory extending section 104 of the present embodiment.

Six steps S701 to S706 of FIG. 10 correspond to the processing sections 601 to 606 of FIG. 9, respectively. That is, the previous trajectory acquisition section 601 executes the operation of the previous trajectory acquisition step S701 to calculate a previous trajectory. Next, the first comment acquisition section 602 executes the operation of the first comment acquisition step S702 to acquire a first comment corresponding to the initial trajectory and the previous trajectory. Next, the following trajectory acquisition section 603 executes the operation of the following trajectory acquisition step S703 to calculate a following trajectory. Next, the second comment acquisition section 604 executes the operation of the second comment acquisition step S704 to acquire a second comment corresponding to the following trajectory from the comment server. Next, the analogous comment selection section 605 executes the operation of the analogous comment selection step S705 to select a second comment analogous to the first comment. Finally, the extended trajectory acquisition section 606 executes the operation of the extended trajectory acquisition S706 to generate an extended trajectory newly by connecting the following trajectory corresponding to the selected second comment to the initial trajectory.

The following describes these steps in more details.

Firstly, the previous trajectory acquisition section 601 executes the previous trajectory acquisition step S701. The previous trajectory acquisition section 601 finds a previous trajectory that is calculated back to the early direction in the time axis of the video from the coordinates of the starting point of the initial trajectory.

Figure 11:
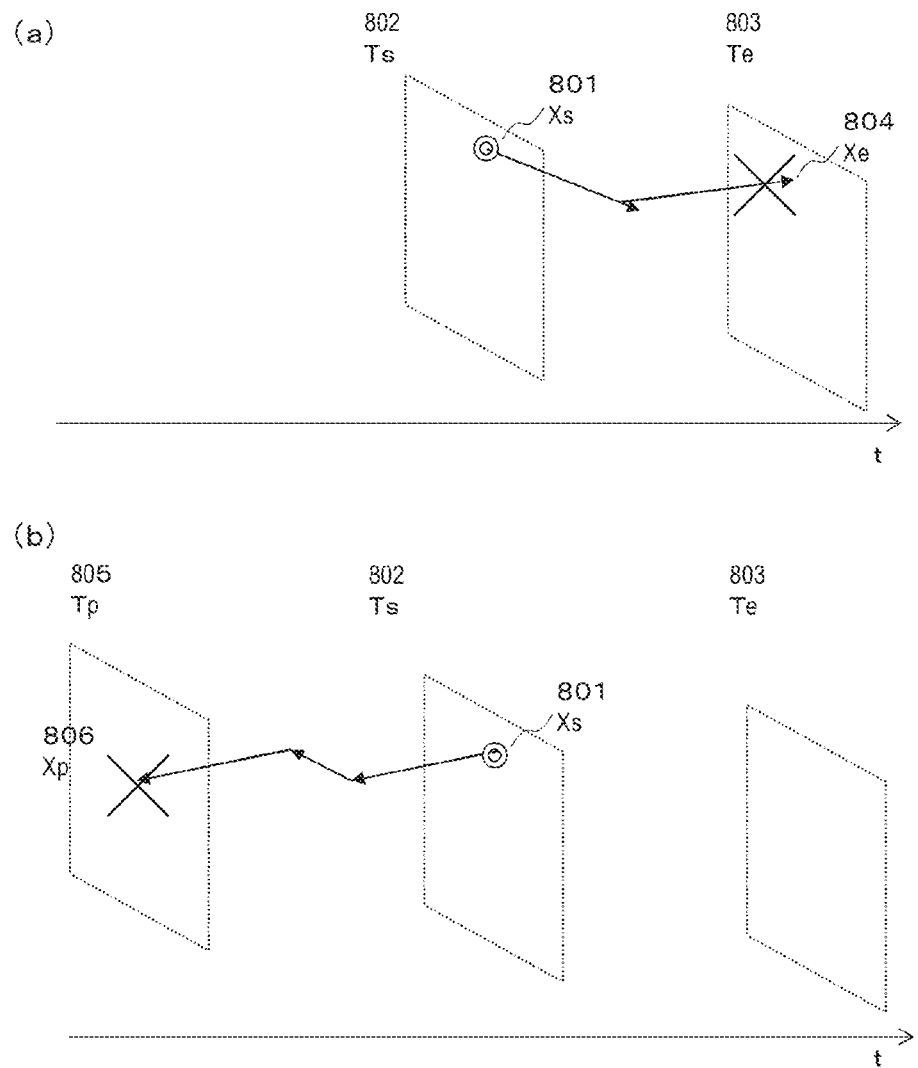
FIG. 11 describes an initial trajectory and a previous trajectory in one embodiment of the present invention.

FIG. 11A shows an exemplary initial trajectory received by the previous trajectory acquisition section. Let that the frame at the starting point of the initial trajectory is Ts(802), the starting point has coordinates of Xs(801), the frame at the ending point is Te(803) and the ending point has coordinates of Xe(804). The drawing shows the case where the scene changes at the frame Te(803), and so the initial trajectory is interrupted. In this case, a method to estimate the trajectory based on typical image features will not work well after the coordinates Xe(804) of the frame Te(803) at the ending point of the initial trajectory.

Then, as shown in FIG. 11B, the present embodiment calculates a previous trajectory back to the early direction in the time axis of the video shown with the arrow and t at a lower part while setting Xs(801) as the origination. A method for the calculation may be similar to the processing of the initial trajectory acquisition section 102, and so the descriptions thereof are omitted. The processing is different from that of the initial trajectory acquisition section 102 in that pictures have to be input in the reverse order of the time passage direction that goes back in time from the coordinates Xs(801) on the frame Ts(802) as the origination unlike the processing of the initial trajectory acquisition section 102. Such processing can yield a previous trajectory as shown in FIG. 11B.

Next, the first comment acquisition section 602 executes the first comment acquisition step S702. The first comment acquisition section 602 inquires a comment server about a plurality of comments (first comments) assigned in the vicinity of the initial trajectory and the previous trajectory for acquisition. Herein, the vicinity of a trajectory may be within a radius of pixels r that is determined beforehand. For instance, r=10. Instead of a radius, a rectangle may be used.

Figure 12:
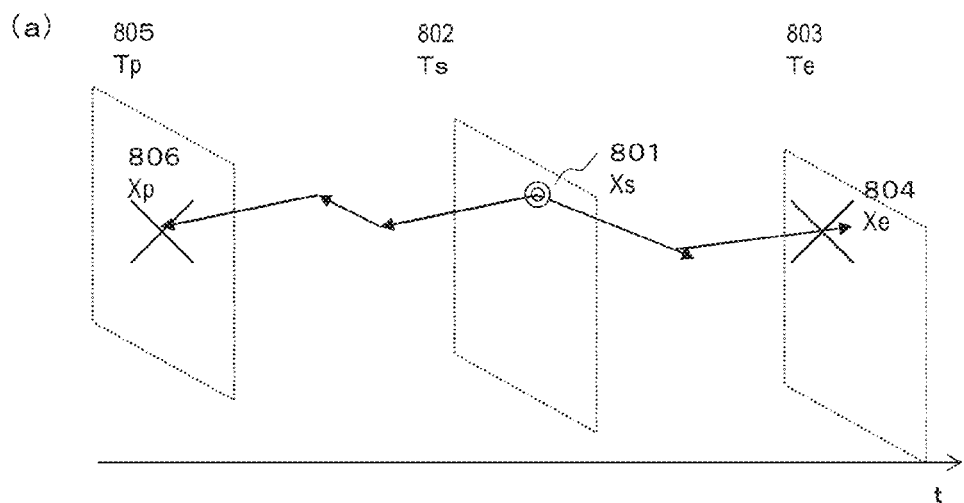
FIG. 12 describes an example to collect comments on an initial trajectory and a previous trajectory for analysis in one embodiment of the present invention.
Figure 12:
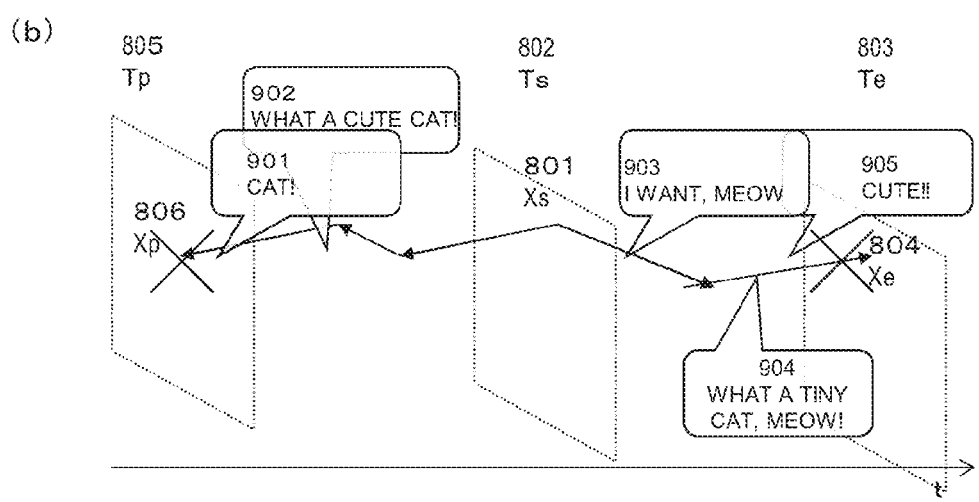
Figure 12:
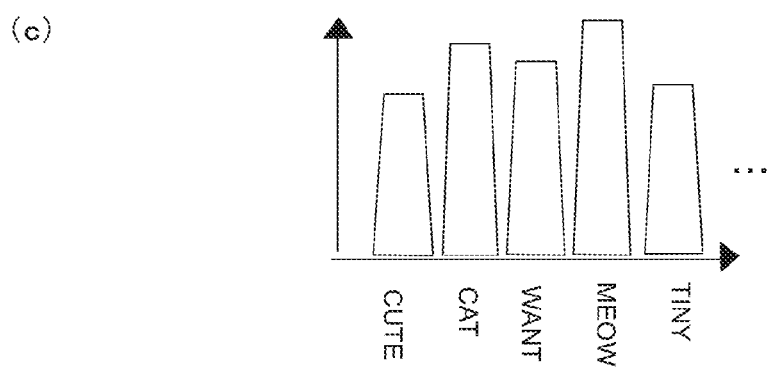

FIG. 12A shows both of the initial trajectory and the previous trajectory. FIG. 12B shows an example where comments are assigned for both of these two trajectories in the vicinity of the coordinates of the trajectories at each frame. They can be acquired by making an inquiry to a comment server to store comments therein in a wired or wireless manner. The thus acquired plurality of comments are first comments.

The present embodiment uses sentence information of these first comments as information to extend the initial trajectory backward. Various methods to analyze sentences have been proposed. Especially for Japanese, a sentence is firstly subjected to morphological analysis, and then the sentence is separated into string of words. Famous free and open soft tools for morphological analysis include MeCab and ChaSen, for example.

FIG. 12C shows an example where morphological analysis is performed for the plurality of first comments acquired by the first comment acquisition section, thus separating them into words, and a histogram is created simply based on the number of times of appearances of the words. This example assumes a cat in a video as an object, and it is highly possible that the same word appears a plurality of times among a plurality of comments for a specific object, and so it can be said that comment information can be effectively used to extend a trajectory.

The present embodiment finds a previous trajectory and collects first comments along the trajectory that is obtained by connecting the previous trajectory to the initial trajectory. Instead, when comments can be collected sufficiently from the initial trajectory, the first comments may be collected without finding the previous trajectory. From this point of view, the previous trajectory acquisition section 601 and the previous trajectory acquisition step S701 are arbitrary configurations.

Next, the following trajectory acquisition section 603 executes the following trajectory acquisition step S703. The following trajectory acquisition section 603 finds a following trajectory that is calculated in the late direction in the time axis of the video from any coordinates of a frame after the ending point of the initial trajectory. A method for the calculation may be similar to the processing of the initial trajectory acquisition section 102, and so the descriptions thereof are omitted. A point, from which calculation of the following trajectory is started, will be described later.

Next, the second comment acquisition section 604 executes the second comment acquisition step S704. The second comment acquisition section 604 acquires a comment assigned in the vicinity of the following trajectory from the comment server as a second comment.

Figure 13:
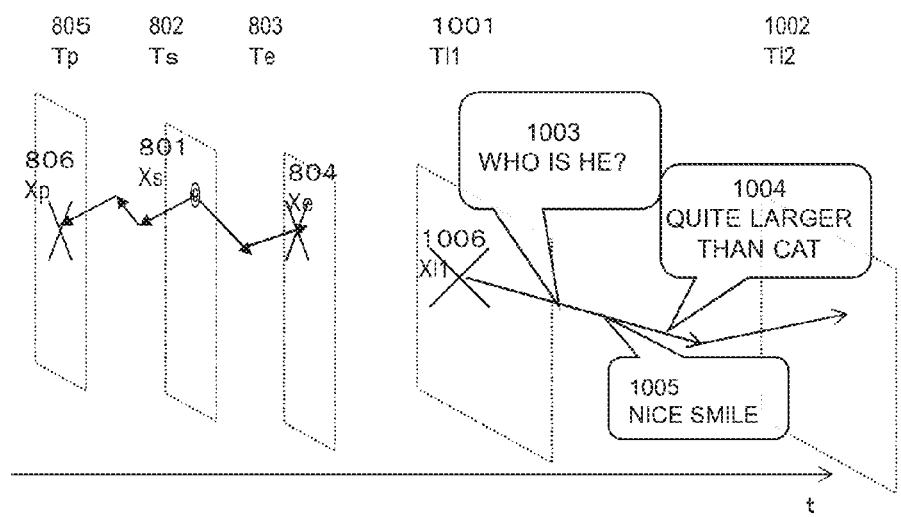
FIG. 13 describes an example of comments on a following trajectory in one embodiment of the present invention.
Figure 13:
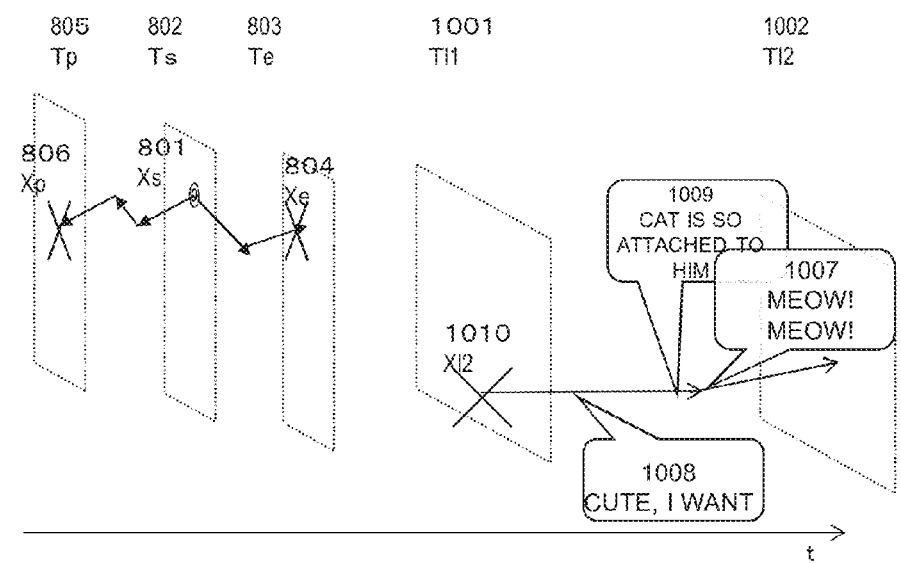

FIG. 13 shows exemplary second comments acquired for different following trajectories. A following trajectory starting from coordinate X11 (1006) of frame T11 shown in FIG. 13A is an example corresponding to an owner of a cat in this case. Different comments from those of the example of FIG. 12B are assigned. Meanwhile, a following trajectory starting from coordinate X12 (1010) of frame T11 shown in FIG. 13B is an example including a cat as same in FIG. 12B as an object. Although the sentences are different, comments analogous to those of FIG. 12B can be acquired. In a communication on a video, it is highly possible that comments specific to an object or units of parts of an object are assigned, and trajectories about the same object across a scene change can be connected using such information, which cannot be connected by a typical method based on brightness.

Figure 14:
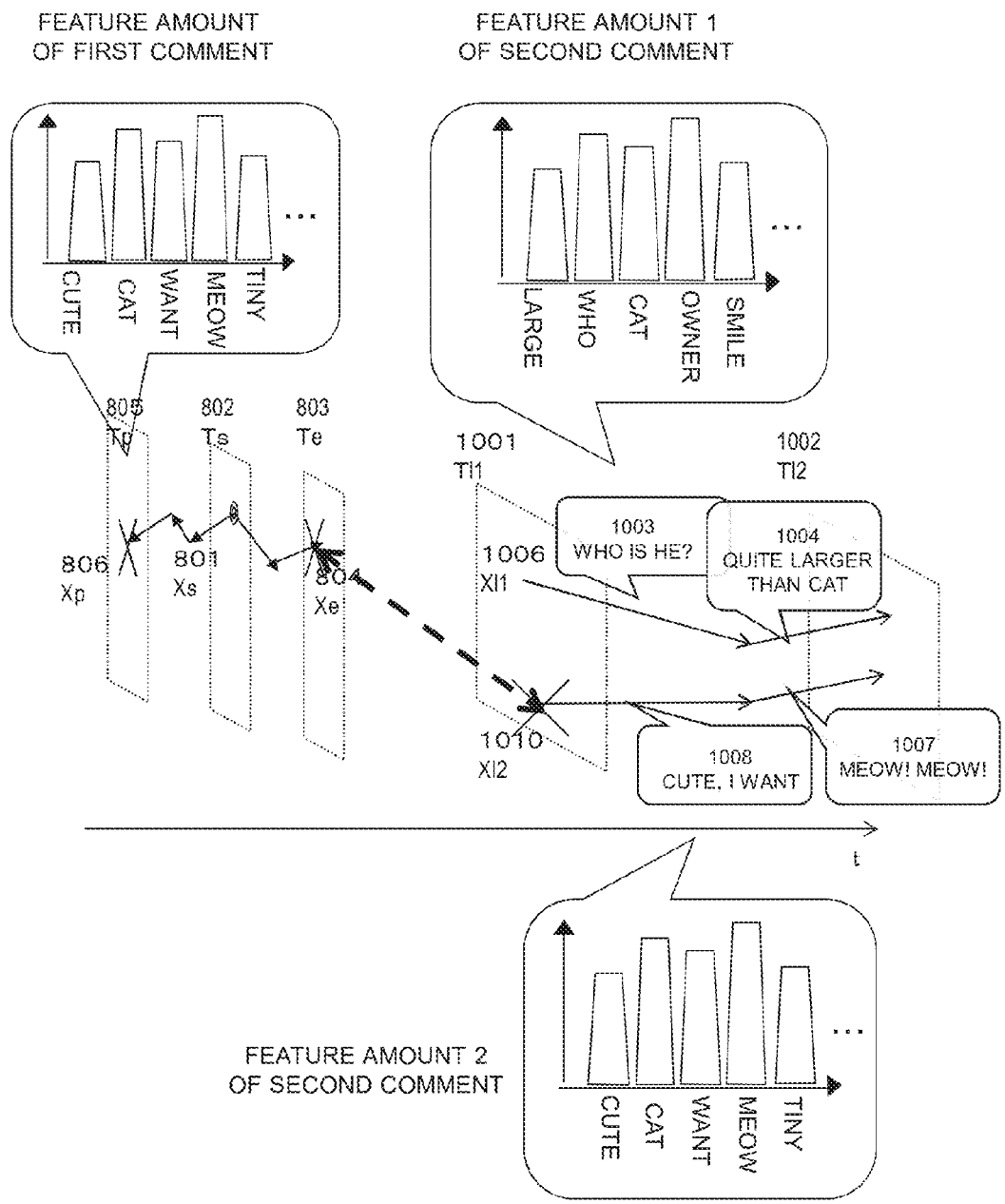
FIG. 14 describes how to connect a following trajectory depending on the similarity of a comment in one embodiment of the present invention.

Next, the analogous comment selection section 605 executes the analogous comment selection step S705. The analogous comment selection section 605 selects a second comment sufficiently analogous to the first comment. FIG. 14 is a conceptual diagram to select an analogous comment. This drawing shows the simplest example of an analysis result about sentence feature amounts of a comment group by morphological analysis. As can be understood, comparison of the number of times of appearances of characteristic words assigned to an object shows that it is clearly better in this example to connect the following trajectory starting from coordinate X12 (1010) after the initial trajectory as stated above.

Such a connection enables, when a comment of "what a cute cat!" is assigned to coordinate (Xs) (801) at frame Ts (802), for example, such a comment of "what a cute cat!" can be kept to be displayed on the following trajectory starting from coordinate X12 (1010) that is a trajectory on the same cat instead of displaying the comment of "what a cute cat!" on the following trajectory starting from coordinate X11 (1006) that is a trajectory of the owner after a scene change.

FIG. 14 shows the example of comparison of a distance between histograms using the number of times of appearance of words to evaluate the similarity between comments, and various other methods have been proposed therefor.

Especially a simple comparison fails to calculate a similarity considering analogous words and words that are closer to each other conceptually, and so it is desirable that a word group subjected to the morphological analysis is weighted based on thesaurus or concept-based descriptions in a dictionary for feature-vector representation, from which inter-vector similarities are calculated based on cosine correlation as similarities between the comments.

Patent Document 6, for example, proposes a method of separately quantifying information on the polarity of meaning of a word or a letter, and reflecting the resultant on a similarity calculation. Such a method enables precise evaluation of similarities while reflecting meaning and concept of words thereon.

Patent Document 7 proposes a method of generating feature vectors of words, which are subjected to morphological analysis, using Term Frequency (TF)/Inverse Document Frequency (IDF), co-occurrence frequency, frequency of sentence types as the feature amounts, and using the thus generated feature vectors to calculate similarities. Such a method may be used, for example, to calculate a feature vector using the length of a sentence (a short sentence and a long sentence are characteristically different in the structure of words) instead of the sentence type, whereby a similarity can be evaluated more suitably for the present method while considering how each word describes each object characteristically.

Note that a large number of methods other than those described above have been proposed to calculate similarities of sentences, and such methods also can be applied to the present method similarly.

Patent Document 6: Japanese Patent Application Laid-Open No. 2011-159098

Patent Document 7: Japanese Patent Application Laid-Open No. 2009-053743

For a first comment acquired from the comment server, a comment that is posted more recently may be preferentially acquired or used. More desirably, a comment that is closer to the time when a comment as a target to extend the trajectory is posted may be preferentially acquired or used. Although some conversation topics on an object do not change over time, a topical event may affect the topics. Then a first comment that is closer to the date and time when a user uses the device with the intention of posting a comment may be acquired from the comment server for use, or weight of a closer comment may be used to calculate similarities, whereby comments can be selected more precisely. When it is already known that the present device is used by a user only to post a comment, a time when a more recent comment is posted is closer to the time when the user posted a comment. Therefore a more recent comment simply may be used preferentially.

Finally, the extended trajectory acquisition section 606 executes the extended trajectory acquisition S706. The extended trajectory acquisition section 606 connects the selected following trajectory after the initial trajectory, thus generating an extended trajectory, and outputs the same to the process selection section 103. When frame Te and frame T11 are separated temporally, numerical values that cannot be used as coordinates such as (−1, −1) may be given to the trajectory between Te and T11, for example, in the case where normal coordinate values are positive numbers. This allows a comment input by a user not to be displayed temporarily.

Alternatively, similar processing to the selection of second comments may be performed for the trajectory between Te to T11 as well, whereby a trajectory, to which a comment can be assigned, may be found.

If the similarity of a comment is lower than a predetermined threshold, it is highly likely that the same object does not appear after that. That is, this is the case where any following trajectory to be connected does not exist. In such a case, it is desirable not to connect a following trajectory, and then a trajectory connected to the previous trajectory found earlier can be returned to the process selection section 103 as an extended trajectory. Such a case also can yield an extended trajectory satisfying a predetermined time or having a length closer to a predetermined time.

Alternatively, a "not connectable" flag may be set and be returned to the process selection section 103. The process selection section 103 progresses the processing to the trajectory extending section 104 again and again when the "not connectable" flag is not set, as long as the length of the initial trajectory is shorter than the predetermined time. On the other hand, when the "not connectable flag" is set, the process selection section 103 passes the initial trajectory as it is to the output section 105 exceptionally. Such processing does not change the frame at the staring point of the trajectory, and so the user's intention about the frame at the starting point can be reflected.

A plurality of following trajectories may be found from coordinates of a frame that is after the frame at the ending point of the initial trajectory and is a neighboring frame having a difference from the frame at the ending point within a predetermined certain number of frames. If it is known that the same object will not disappear in spite of a scene change, the certain number of frames may be 1. This can reduce the processing amount required to select a trajectory having similar comments.

Arbitral sampling from coordinates of a nearby frame does not have to be performed necessarily for coordinates to start calculation of the following trajectory. For instance, when the device has remaining power, all of the coordinates of all of the following frames may be processed for finding. Such a way can yield more candidates, and leads to the possibility of extending the initial trajectory more correctly when the same object temporarily disappears after a scene change.

It is often the case as a video technique that an object near the center still remains near the center even after a scene change, and so a following trajectory may be found for coordinates existing in the vicinity of a coordinate at the ending point of the initial trajectory within a certain distance, instead of performing arbitrary sampling. This can suppress the processing amount required to calculate the following trajectory.

The present embodiment is configured to calculate a following trajectory first, and then collect a second comment. Instead, a second comment may be collected first, and a following trajectory may be calculated at a region about a region where comments analogous to a first comment exists. This can suppress the processing amount required to calculate the following trajectory.

Figure 15:
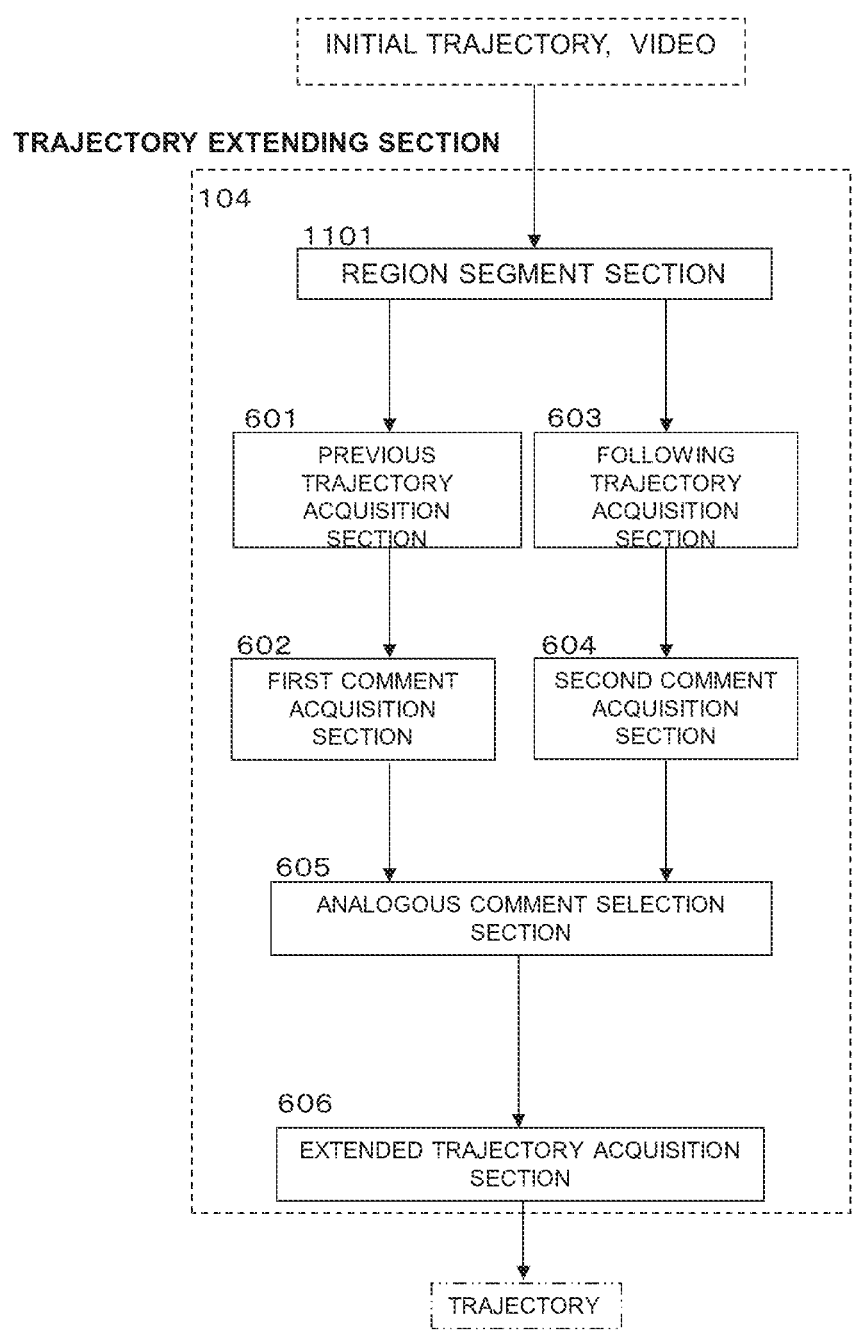
FIG. 15 shows the configuration of a major part of a trajectory extending section in another embodiment of the present invention.

The trajectory extending section may include a region segment section, which segments a picture into regions prior to calculation of a trajectory or after calculation of a trajectory (either will do as long as it precedes the acquisition of a first comment and a second comment). That is, among regions segmented by the region segment section, a small region including the initial trajectory can be used instead of a nearby region of a trajectory for comment acquisition. FIG. 15 shows an exemplary configuration of this case.

For instance, in FIG. 15, a region segment section 1101 segments a picture into a plurality of regions based on the color similarity among pixels or blocks to which each trajectory belongs. In another method, a picture may be segmented into a plurality of regions that is called "superpixel" based on the color similarity of pixels. A graph-based method may be used to calculate the superpixel, for example. Detailed descriptions on the procedure of the processing are provided by Non-Patent Document 4, for example, and their descriptions are omitted. This method is to estimate the boundary between regions based on graph representation of a picture, thus segmenting the picture into small regions effectively while keeping global features. This method is resistant to shielding, and so can provide more robust segmentation.

Non-Patent Document 4: Pedro F. Felzenszwalb and Daniel P. Huttenlocher "Efficient Graph-Based Image Segmentation", International Journal of Computer Vision, Vol. 59, No. 2, pp. 167-181, September, 2004

Especially for a scene where a moving object and the background are different in color, it is likely that each region includes the moving object or the background only (a region in a different color is likely to be separated as a different sub-class), and so a picture can be segmented more correctly into regions moving similarly.

A region segment method based on a motion may be used. Specifically, a method as in Patent Document 8 may be used. This can segment a picture more correctly into a subject region moving similarly even when a moving object and the background are similar in color.

Patent Document 8: Japanese Patent No. 4994525

The region segment section 1101 may be disposed at the following stage of the previous trajectory acquisition section 601 and the following trajectory acquisition section 603.

Finally, the output section 105 executes the output step S305. The output section 105 outputs the initial trajectory or the extended trajectory generated by the initial trajectory acquisition section 102 or the trajectory extending section 104 to the storage device 120 via a wired or wireless communication path. Specifically the initial trajectory or the extended trajectory that is the motion of an object designated by a user with the intention of displaying the object tracked by a comment is stored in a comment database provided in the comment storage/delivery server.

To process input information 111 that is input successively, the comment information generation device 100 may repeat the operations of the aforementioned Steps S301 to S307 every time the input information 111 is input.

The present embodiment describes the case where the initial trajectory acquisition section 102, the previous trajectory acquisition section 601, the following trajectory acquisition section 603, and the extended trajectory acquisition section 606 perform operations, calculations and generation in their own devices, and these devices may be configured to rely on other devices to perform these operations and acquire the results. In the case of a method or a program to execute the steps corresponding to the aforementioned configuration, the present embodiment describes the case of operating, calculating and generating with its own program, which includes the case of acquiring a result from other programs such as library provided in parts such as other devices and a graphic engine to perform video processing, and an OS.

Next, the following describes, as a more desirable embodiment, a comment information generation device that detects a scene change or shielding, and performs optimum processing in accordance with a result of the detection.

Figure 16:
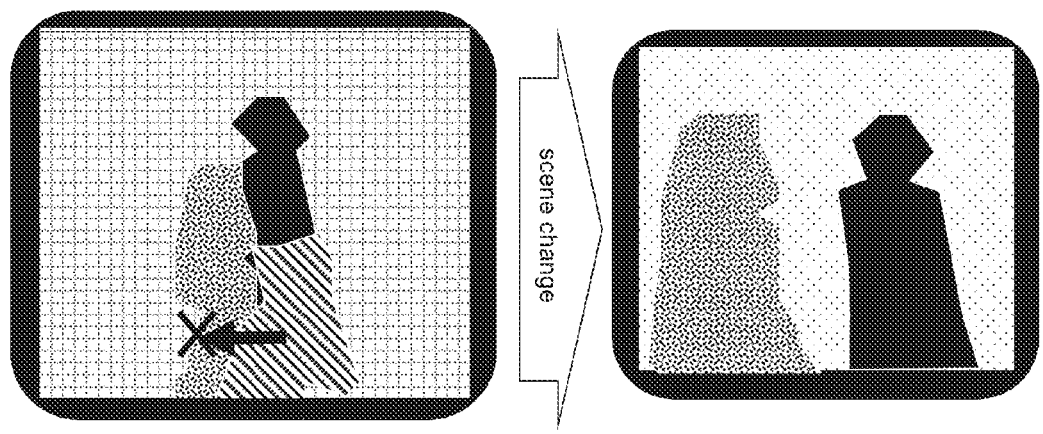
FIG. 16 describes a scene change and shielding generated in one embodiment of the present invention.
Figure 16:
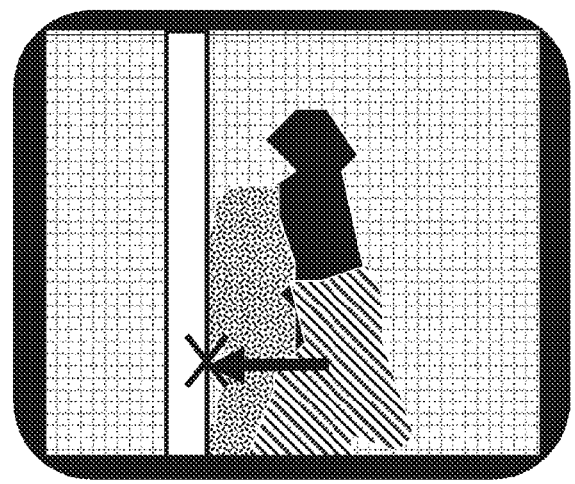

Especially a typical video 110 such as a video of a television program or a video recorded as a movie often involves a scene change, shielding by another object, self-shielding, movement beyond the shooting range of designated pixels or a designated region because of the movement of an object or a camera, and the like. Then for effective trajectory extending processing, it is better to switch processing depending on the factor to select the trajectory extending processing. That is, the trajectory extending section 104 may determine which of "shielding" and "scene change" occurs, and may change a method to calculate a following trajectory and a form to display a comment in accordance with a result of the determination. A form to display a comment will be described later in Embodiment 2. FIG. 16A shows an example of a scene change, and FIG. 16B shows an example of shielding.

A determination can be made as to which one of shielding or a scene change occurs based on a change over time of a brightness histogram of the entire image. That is, when the brightness histogram changes greatly between frames (e.g., the variation in brightness histogram is a predetermined threshold or more), it can be determined that a scene change occurs, and otherwise it can be determined that shielding occurs. Alternatively, when the video 110 is accompanied with temporal information on scene change as metadata, a determination can be made as to whether a scene change occurs or not using such information.

For instance, in the case of a scene change, the appearance of the scene as a whole changes, and so it is desirable to find a following trajectory from the entire image and find an analogous comment. On the other hand, in the case of shielding, the appearance of the scene as a whole does not change, but an object as a tracking target only becomes invisible. In such a case, in order to exclude an object other than the object as a tracking target and the background beforehand from the target to calculate a following trajectory, coordinates that seem to be not continuous from frame Is and frame Te in their trajectories may be selected as a starting point of the following trajectory, whereby a trajectory having analogous comments can be selected more effectively.

Alternatively, in the case of shielding, an object in a video often does not change in the position between before shielding and after shielding. Then, when shielding is detected, calculation of a following trajectory may be started in the vicinity of an object of a frame at the ending point of the trajectory. For instance, a predetermined radius may be set or a region having the extent in proportion to the size of an object may be set, thus starting calculation of a following trajectory.

In this way, a region to calculate a following trajectory is set narrower in the case of shielding and other events except scene changes than in the case of a scene change, whereby a following trajectory can be calculated more effectively.

Other factors to select the trajectory extending process may include, in addition to shielding or a scene change, interruption in calculation of a trajectory due to a change in brightness resulting from a light source environment or blurring due to movement. In such a case, since it can be said that the object to be tracked is actually visible and the appearance of the scene as a whole does not change so much, the processing similar to the case of shielding may be selected. That is, the processing can be performed by detecting a scene change only, and other processing can be performed otherwise.

The thus configured comment information generation device 100 can display a comment without interruption. Then, a user is allowed to read the comment within the display time while a video to which the comment is attached is displayed, and is allowed to easily know visually as to to what object the comment is assigned. In this way, comment information can be generated so as to improve the viewability of the comment.

Moreover, especially when a comment-added video is generated for a video where scenes change one after another in few seconds as in commercial video contents, a trajectory will be interrupted every time a scene changes, and so the comment breaks and the number of comments is reduced. The present invention can display the comment for an object in the preceding scene continuously in the subsequent scene with the same object, and so can improve the viewability of the comment while preventing reduction in the number of comments as a whole, thus activating the communication.

Second Embodiment

The first embodiment describes the invention relating to a comment information generation device, which may be implemented with a user's terminal, in a video server or a comment storage server or with other servers. The present embodiment describes the invention relating to a comment display device such as a user's terminal that lets a user view a comment attached to a video. That is, the present embodiment is mainly directed to a terminal that audience possesses, such as a PC, a tablet, a mobile phone or a car navigation system. Needless to say, this can be used with a terminal to be used to check images at a broadcast station and manage a server.

Figure 17:
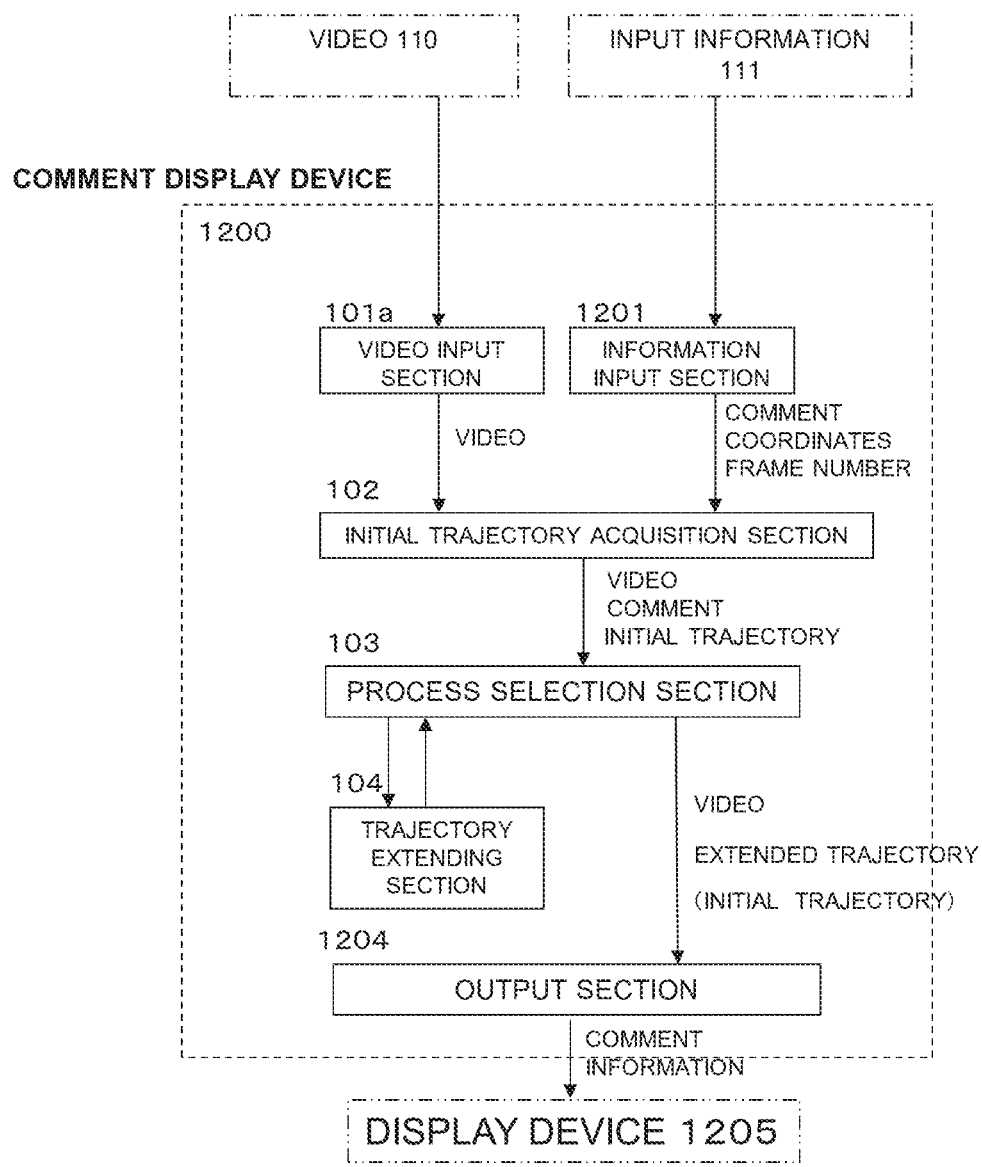
FIG. 17 shows the configuration of a comment display device that is a second embodiment of the present invention.

The present embodiment describes a comment display device, and its configuration is substantially the same as that of the comment information generation device as the first embodiment shown in FIG. 3. FIG. 17 shows the configuration of a comment display device of the present embodiment. The present embodiment is different from the first embodiment in the following respects. That is, a comment input by a user is included in input information 111 input to an information input section 1201 and in comment information that an output section 1204 outputs. The output section 1204 outputs to a display device 1205 such as a CRT or a liquid crystal display. Then the output section 1204 has a function to determine the display form of a comment so as to be easily visible on the basis of a video, an extended trajectory or an initial trajectory, and comment information. The following describes them in more details, with reference to FIG. 17.

The information input section 1201 receives information on a comment that a user inputs with the intention of displaying it to track an object in the video, a frame, and a coordinate.

The received information may include information that is used finally for display, such as a posting time and a user's name. Information may be input to the information input section 1201 by reading information directly or via a communication path, the information relating to a time, a coordinate and the like on a video that is input by clicking of a mouse or touching of a touch panel by a user, and comment sentences and a user name that are input by keying of a keyboard, touching of a software keyboard and the like by a user, for example. At this time, the posting time may be acquired from a system that the user uses or from the main body of the comment display device 1200 in a wired or wireless manner.

More specifically, when a terminal side detects an input using a mouse, a key, or by touching by a user, a video 110 on a terminal that the user views is automatically suspended, and in this state, the information is received. A comment may be posted in the state where the reproduction of a video 110 is suspended by an operation by a user on a screen.

Figure 18:
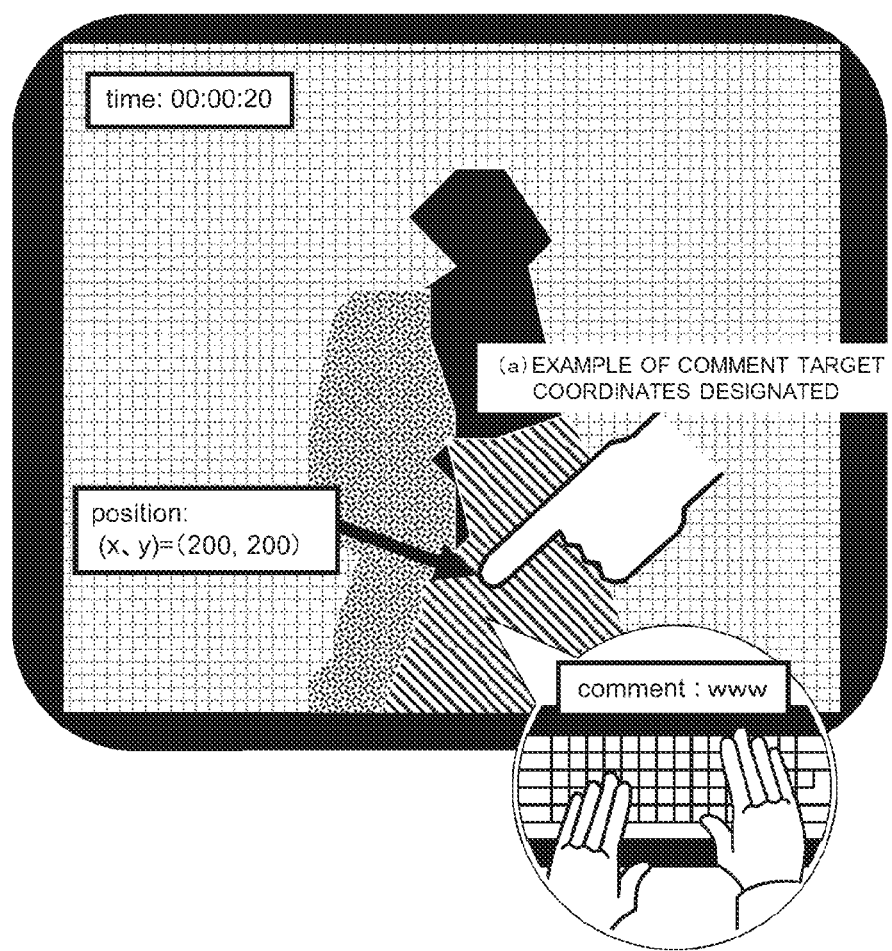
FIG. 18 describes the case where a user inputs a comment on a video with the comment display device that is the second embodiment of the present invention.

For instance, in the state where the reproduction of a video 110 as a target is suspended on a display screen shown in FIG. 18A, a user designates a certain coordinate on the screen. Then in response to this designation, a pop-up screen may be displayed in a superimposed manner on the comment display device 1200, and the user may be allowed to post a comment by inputting the comment in the pop-up screen.

The output section 1204 receives an extended trajectory or the like from the process selection section 103 and determines the shape or the display position of a comment, combines the information included in the input information 111 and the video 110, and outputs the resultant to the display device 1205 via a wired or wireless communication path. The output information at least includes a frame at the starting point of a trajectory and sentence information in the input information 111 and an initial trajectory or an extended trajectory generated by the initial trajectory acquisition section 102 or the trajectory extending section 104. More desirably, when the input information 111 includes the following information, information such as the color, the shape and the font of a comment sentence and a balloon may be included. This can generate comment information that can be displayed while reflecting user's intention well.

The output section 1204 determines the shape of a comment, the display timing and a method to display a picture in accordance with a state of a scene change or shielding, and then passes them to the display device 1205. The following describes a specific example, with reference to FIG. 19.

Figure 19:
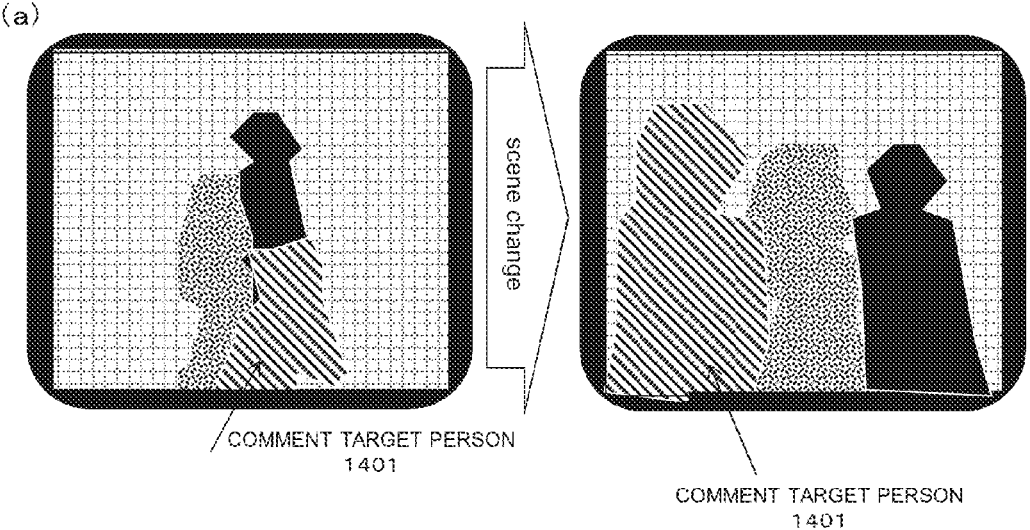
FIG. 19 describes an exemplary object, to which a comment is to be added, in the comment display device that is the second embodiment of the present invention.
Figure 19:
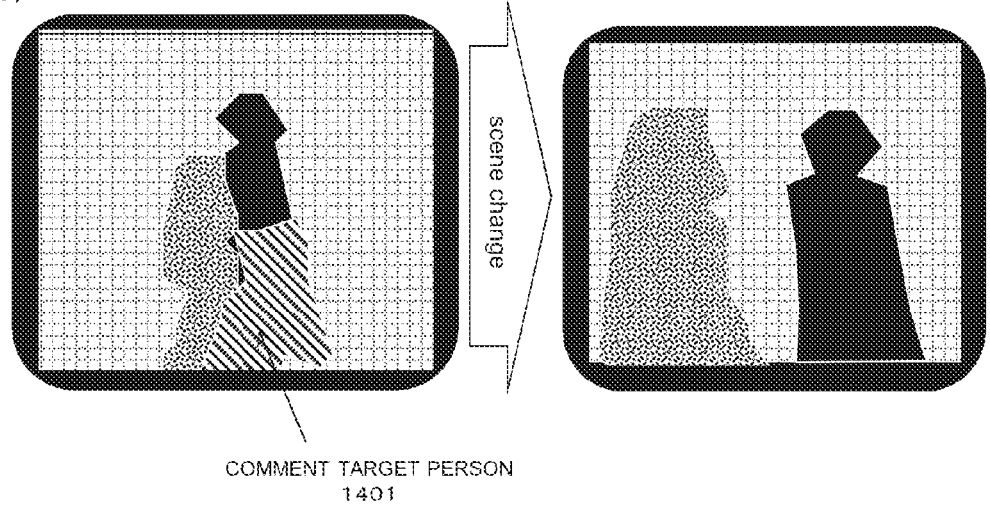

FIG. 19 shows an example of a scene where an initial trajectory is interrupted. The following especially describes the reason why a comment display method has to be changed depending on whether the object as a target of tracking by a comment exists or not after the extension processing, and how the comment display method should be changed so as to secure the viewability of a user of a comment. FIG. 19A shows an exemplary scene change, where a comment target person 1401 remains after a scene change. The extended trajectory can be easily determined because it indicates a positive coordinate value that is not (−1, −1) before and after the scene change in the example of shown in the first embodiment, for example. FIG. 19B shows an exemplary scene change, where the comment target person 1401 is not shown after a scene change. The extended trajectory can be easily determined because it indicates (−1, −1) after the scene change in the example of shown in the first embodiment, for example.

Figure 20:
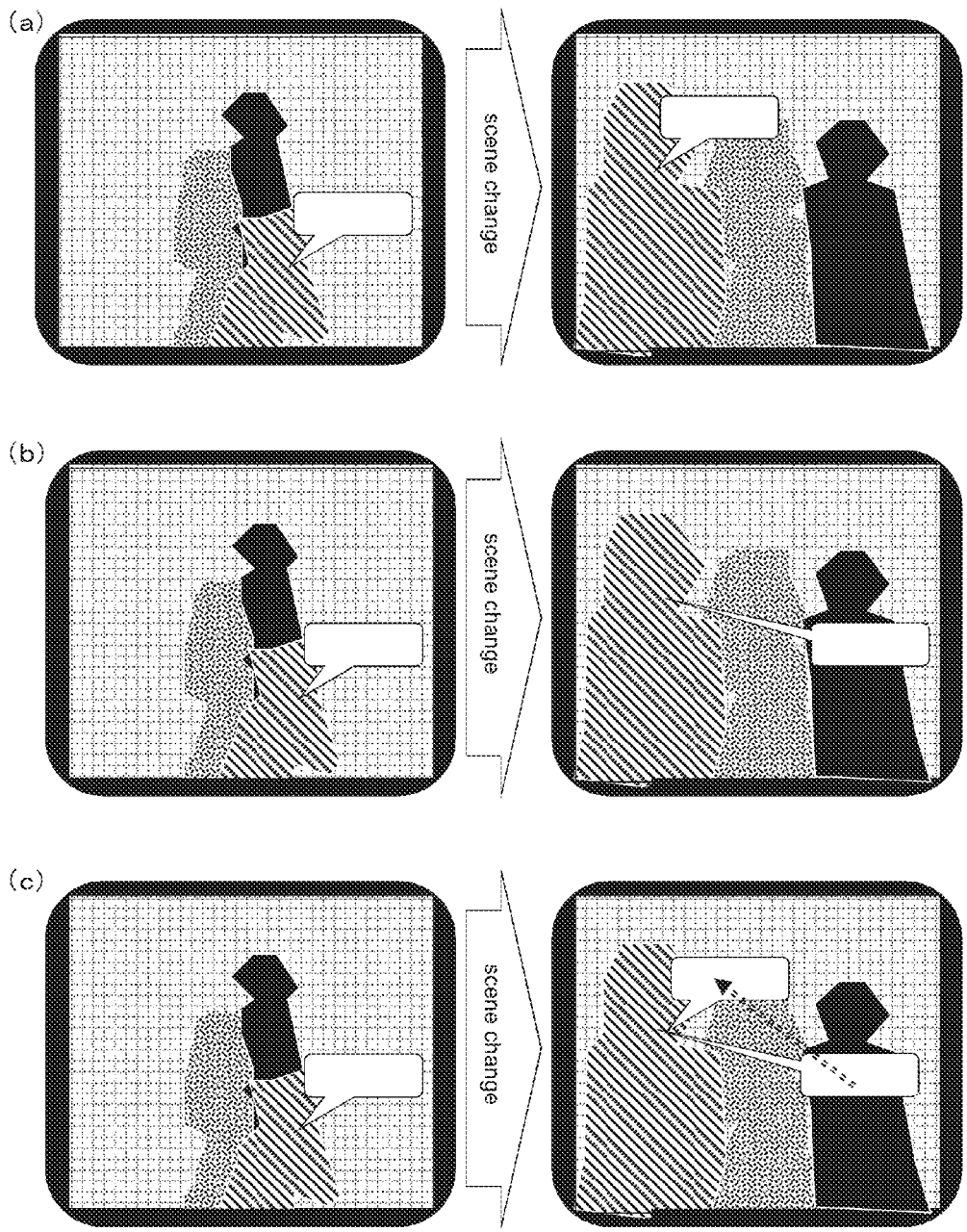
FIG. 20 describes an exemplary display of the comment display device that is the second embodiment of the present invention.

FIG. 20 shows an exemplary comment display method in the case of FIG. 19A.

Figure 21:
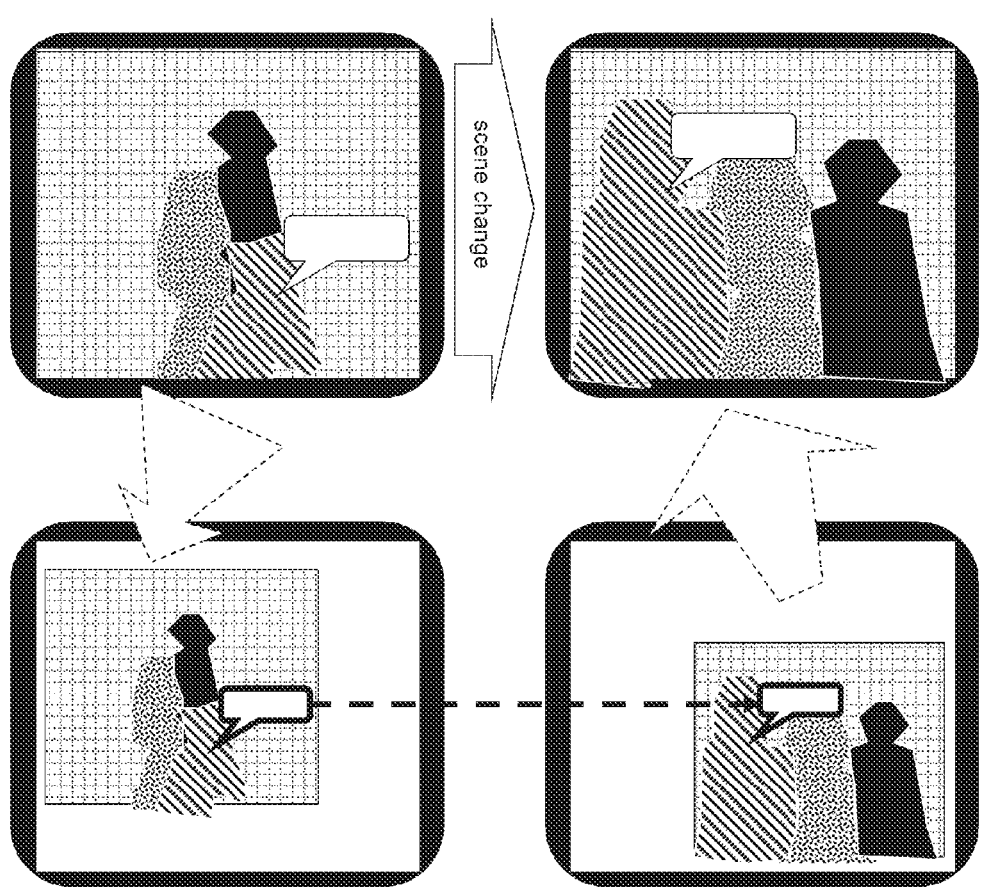
FIG. 21 describes another exemplary display of the comment display device that is the second embodiment of the present invention.

When the same object remains in a screen after the scene change, it is desirable that the comment tracks a changing position of the object together with the balloon thereof (FIG. 20A). This is because the comment is intended for the object. However, when it is displayed actually, if the object changes greatly in the position before and after a scene change, tracking with the balloon as a whole may degrade the viewability because user's eyes that view the image cannot follow the motion. This means that a comment should be clear about what object the comment refers to, and it is desirable that the letters of the comment move less. That is, as shown in FIG. 20B, a comment is preferably displayed so as to let the tip end of the balloon only track the movement of the object without moving the part of sentences in the comment, for example. A similar effect can be obtained from a method as shown in FIG. 20C to let the tip end of the balloon only track the object first, and then let a part of the sentences of the comment track slowly at a speed that a user can view. As still another method, as shown in FIG. 21, in order to minimize the change of a balloon in position, the entire image including a balloon may be displayed just before a scene change while reducing the size gradually, then the image reduced in size after the scene change is displayed so that the balloon after the scene change is located at the same position, and then the size may be enlarged gradually to the original size. This allows a balloon that does not move before and after the scene change while pointing out the same object, and so a user can view the comment easily.

Figure 22:
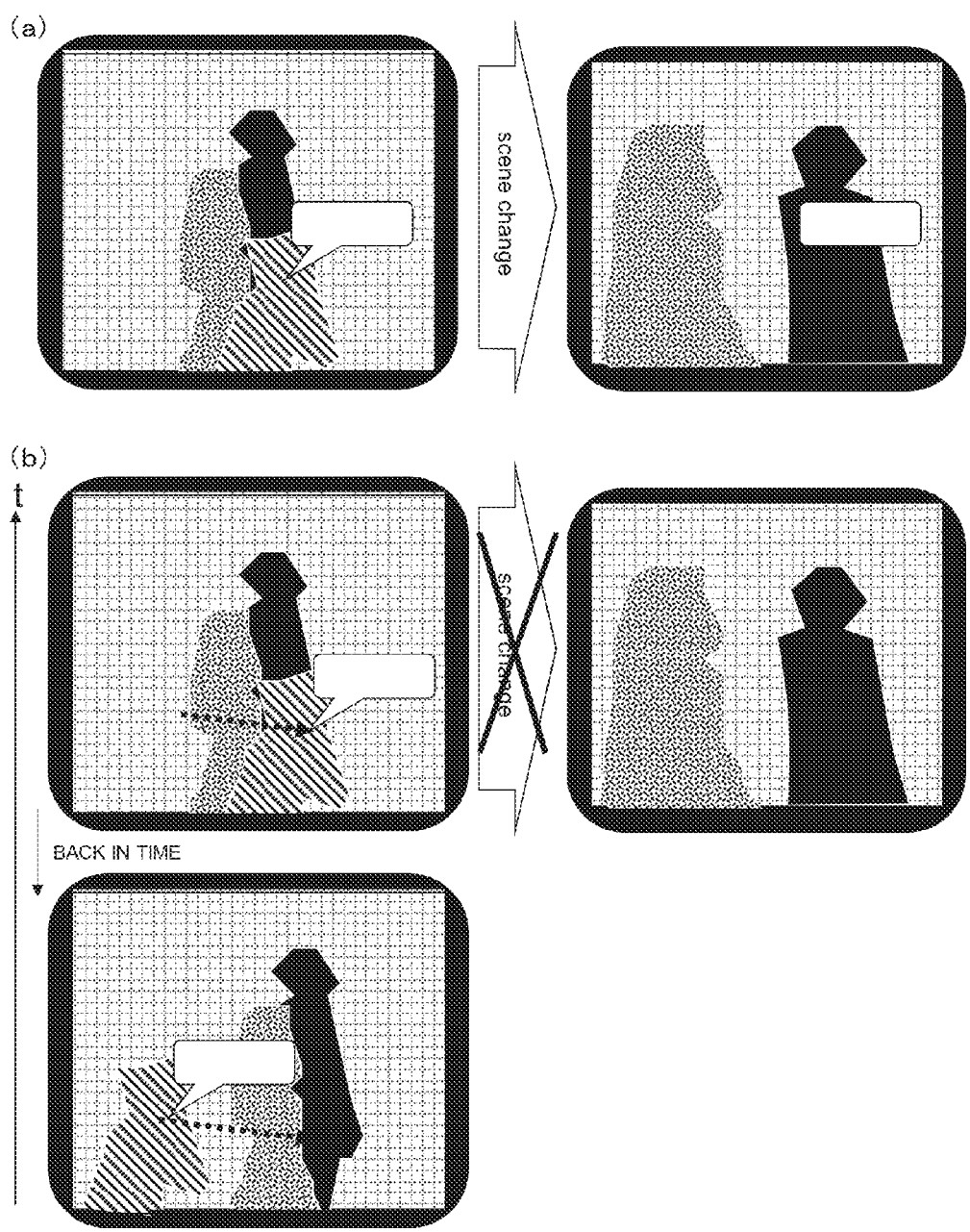
FIG. 22 describes still another exemplary display of the comment display device that is the second embodiment of the present invention.

On the other hand, when the same object does not exist in the screen after the scene change as in FIG. 22, the extended trajectory shows (−1, −1) immediately after the scene change until the object appears again. Desirably a balloon moves gently from the coordinate immediately after the scene change to the coordinate when the object appears again, and if the object does not appear again, the balloon may stay at the same position, for example, whereby the viewability of comment letters can be kept temporally. However, it is not desired that the remaining comment indicates another specific object. This is because, since the comment is not intended for the other specific object, this may cause misunderstanding of a viewer. Then, they have to be displayed while keeping the viewability of the comment and not causing such misunderstanding.

In the simplest way, as shown in FIG. 22A, the tip end part of the balloon may be removed after the scene change. The tip end of a balloon gives a large impression of "pointing out the object". Then, the tip end only may be removed from the image, whereby the impression that the comment refers to another object instead of the comment-targeted object, when the target object does not appear, can be lowered.

Alternatively, after a scene change, a balloon may be gradually reduced in contrast or deleted as in an after image or may be faded out from the screen.

After acquiring the previous trajectory, a comment may be displayed so as to be back in time from the display starting point as shown in FIG. 22B. This can avoid the assignment of a comment to another object, and so a track display time that is enough for a user to read comment letters can be achieved.

A determination may be made whether a scene change occurs or other events occurs after the ending point of the initial trajectory, and a display form of the comment may be changed in accordance with a result of the determination. A method to detect a scene change is as stated above.

When a scene change occurs, the object typically moves more, and so the balloon also moves more. Then, in the case of a scene change, the balloon is deleted gradually.

On the other hand, when events other than a scene change occur, the object typically moves less, and so the balloon also moves less. Then, in the case other than a scene change, a balloon is displayed so as to track the object.

Of course, a display form may be changed otherwise.

These general or specific aspects of the invention and the embodiments described in the present specification may be each achieved as a system, a method, an integrated circuit, a computer program, a recording medium such as a CD-ROM recording such a computer program thereon, or any combination thereof.

The present invention is applicable as a comment information generation device and a comment display device, for example, that are built into AV equipment such as a tablet PC, a smartphone, a mobile phone, a PC, a car navigation system, a video camera and a TV that can acquire or display a video through a network connection, for example.

DESCRIPTION OF REFERENCE SYMBOLS

100: comment information generation device
101*a*: video input section
101*b*: information input section
102: initial trajectory acquisition section
103: process selection section
104: trajectory extending section
105: output section
110: video
111: input information
120: storage device
1200: comment display device

The invention claimed is:

1. A comment information generation device comprising:
a video input circuit, to which a video is input;
an information input circuit, to which positional information that a user inputs is input to display a comment so as to track an object in the video;
an initial trajectory acquisition circuit that acquires an initial trajectory that is a trajectory of the object corresponding to the positional information;
a trajectory extending circuit that acquires an extended trajectory by acquiring a following trajectory that is a trajectory having a starting point after an ending point of the initial trajectory, collecting a first comment assigned in a vicinity of the initial trajectory and a second comment assigned in a vicinity of the following trajectory, and connecting the following trajectory to the initial trajectory on a basis of the first comment and the second comment; and
an output circuit that outputs the extended trajectory as comment information.

2. The comment information generation device according to claim 1, wherein the trajectory extending circuit acquires the extended trajectory by calculating a plurality of the following trajectories, selecting at least one of the plurality of following trajectories on a basis of the first comment and the second comment, and connecting the selected following trajectory to the initial trajectory.

3. The comment information generation device according to claim 2, wherein the trajectory extending circuit selects the following trajectory, to which the second comment having the highest similarity to the first comment is assigned.

4. The comment information generation device according to claim 1, wherein the trajectory extending circuit acquires a previous trajectory that is a trajectory preceding a starting point of the initial trajectory, and collects a first comment assigned in a vicinity of the initial trajectory and the previous trajectory.

5. The comment information generation device according to claim 1, wherein the trajectory extending circuit collects a comment that is posted more recently to collect the first comment or the second comment.

6. The comment information generation device according to claim 1, wherein the trajectory extending circuit adds, for the first comment or the second comment, more weight to a word that is obtained by morphological classification from a comment that is posted at a date and a time closer to a time when the information input circuit receives a user's input, on a feature vector used for similarity calculation.

7. The comment information generation device according to claim 1, further comprising: a process selection circuit that, when a duration of the initial trajectory is less than a predetermined time, selects to perform processing at the trajectory extending circuit, and otherwise selects to output the initial trajectory as it is from the output circuit as the comment information.

8. The comment information generation device according to claim 1, wherein the trajectory extending circuit determines whether a scene change or an event other than the scene change occurs after the ending point of the initial trajectory, and in accordance with a result of the determination, determines a region in the video, from which the following trajectory is to be acquired.

9. The comment information generation device according to claim 8, wherein the region is narrower when it is determined that an event other than a scene change occurs than when it is determined that a scene change occurs.

10. The comment information generation device according to claim 8, wherein when a variation in a brightness histogram of the video is a predetermined threshold or more, it is determined that a scene change occurs.

11. The comment information generation device according to claim 8, Wherein, when it is determined that an event other than a scene change occurs, a trajectory other than that is continuous to a trajectory existing at a frame before the ending point of the initial trajectory is set as the following trajectory.

12. The comment information generation device according to claim 8, Wherein, when it is determined that a scene change occurs, the following trajectory is acquired at the entire region of the video.

13. The comment information generation device according to claim 1, wherein the comment is further input to the information input circuit, and the output circuit outputs the comment information and the comment to a display device.

14. The comment information generation device according to claim 7, wherein the comment is further input to the information input circuit, and the output circuit outputs the comment information and the comment to a display device.

15. The comment information generation device according to claim 14, wherein the display device displays the comment during the predetermined time from an input time of the positional information in the video or during the predetermine time till the ending point of the initial trajectory, on a basis of the extended trajectory.

16. The comment information generation device according to claim 13, wherein the output circuit determines whether a scene change or an event other than a scene change occurs after the ending point of the initial trajectory, and changes a display form of the comment in accordance with a result of the determination.

17. The comment information generation device according to claim 13, wherein the output circuit differentiates a display form of the comment between a case where the object as a tracking target exists and a case where the object does not exist after the ending point of the initial trajectory, and outputs the resultant to the display device.

18. The comment information generation device according to claim 17, Wherein, when there is a temporal interval between the ending point of the initial trajectory and the starting point of the following trajectory, the output circuit does not display the comment during the temporal interval.

19. A comment display device comprising:
a receiving circuit that receives the comment information from the comment information generation device according to claim 1; and
a display circuit that displays the video and the comment.

20. A comment information generation method comprising the steps of:
a video input step of inputting a video;
an information input step of inputting positional information that a user inputs to display a comment so as to track an object in the video;
an initial trajectory acquisition step of acquiring an initial trajectory that is a trajectory of the object corresponding to the positional information;
a trajectory extending step of acquiring an extended trajectory by acquiring a following trajectory that is a trajectory having a starting point after an ending point of the initial trajectory, collecting a first comment assigned in a vicinity of the initial trajectory and a second comment assigned in a vicinity of the following trajectory, and connecting the following trajectory to the initial trajectory on a basis of the first comment and the second comment; and an output step of outputting the extended trajectory as comment information.

21. A non-transitory computer-readable medium storing a program which makes a computer execute the comment information generation method according to the claim 20.

* * * * *